US008625789B2

(12) United States Patent
McGowan

(10) Patent No.: US 8,625,789 B2
(45) Date of Patent: Jan. 7, 2014

(54) DYNAMIC ENCRYPTION

(75) Inventor: Albert John McGowan, Phoenix, AZ (US)

(73) Assignee: Unicorn Media, Inc., Tempe, AZ (US)

( * ) Notice: Subject to any disclaimer, the term of this patent is extended or adjusted under 35 U.S.C. 154(b) by 0 days.

(21) Appl. No.: 13/245,465

(22) Filed: Sep. 26, 2011

(65) Prior Publication Data
US 2013/0080772 A1     Mar. 28, 2013

(51) Int. Cl.
H04N 7/167     (2011.01)
(52) U.S. Cl.
USPC ........................................................ 380/200
(58) Field of Classification Search
USPC ............ 380/200, 201, 277, 286, 44; 713/164, 713/189, 193
See application file for complete search history.

(56) References Cited

U.S. PATENT DOCUMENTS

| | | | |
|---|---|---|---|
| 5,612,742 A | 3/1997 | Krause et al. | |
| 6,505,169 B1 | 1/2003 | Bhagavath et al. | |
| 6,678,332 B1 | 1/2004 | Gardere et al. | |
| 6,792,047 B1 | 9/2004 | Bixby et al. | |
| 6,912,315 B1 | 6/2005 | Wong et al. | |
| 7,096,481 B1 | 8/2006 | Forecast et al. | |
| 7,116,894 B1 | 10/2006 | Chatterton | |
| 7,788,581 B1 | 8/2010 | Bauermeister | |
| 7,827,298 B2 | 11/2010 | Black et al. | |
| 7,877,511 B1 | 1/2011 | Berger et al. | |
| 7,925,549 B2 | 4/2011 | Looney et al. | |
| 7,925,849 B2 | 4/2011 | Izumi | |
| 7,958,007 B2 | 6/2011 | Urbanski et al. | |
| 7,992,165 B1 | 8/2011 | Ludewig et al. | |
| 8,027,787 B2 | 9/2011 | Odinak et al. | |
| 8,027,876 B2 | 9/2011 | Taylor | |
| 8,099,473 B2 * | 1/2012 | Biderman et al. | ............ 709/217 |

(Continued)

FOREIGN PATENT DOCUMENTS

| | | |
|---|---|---|
| AU | 2010/202741 B1 | 12/2010 |
| CN | 101282478 A | 8/2008 |

(Continued)

OTHER PUBLICATIONS

Australian Patent Office, Examiner's First Report on Patent Application No. 2010202740 for Unicorn Media, Inc., dated Aug. 10, 2010, 3 pages.

(Continued)

*Primary Examiner* — Beemnet Dada
(74) *Attorney, Agent, or Firm* — Kilpatrick Townsend & Stockton LLP

(57) ABSTRACT

Systems and methods for encrypting a media file for streaming and/or downloading over a network are disclosed. These systems and methods may be part of a larger media servicing network that can be used to, among other things, process uploaded media content, provide it for streaming, and collect metric information regarding the streaming. The disclosed systems and methods provide for receiving requests for a media file or a chunk of a media file and responding to these requests by encrypting the requested chunks dynamically and providing the chunks to the requesting entity. These systems and methods, which can be utilized with a dynamic chunk generation and dynamic index file generation, enable a high degree of flexibility in streaming chunked media files and preclude the need to encrypt the chunks prior to streaming. The systems and methods may also be applied to encrypting files for continuous streaming protocols as well as for progressive download.

25 Claims, 16 Drawing Sheets

(56) References Cited

U.S. PATENT DOCUMENTS

| | | | |
|---|---|---|---|
| 8,145,782 B2 * | 3/2012 | McGowan et al. | 709/231 |
| 8,165,343 B1 | 4/2012 | McGowan | |
| 8,218,651 B1 | 7/2012 | Eshet et al. | |
| 8,239,546 B1 | 8/2012 | McGowan | |
| 8,301,733 B2 | 10/2012 | McGowan | |
| 2001/0029525 A1 | 10/2001 | Lahr | |
| 2002/0029282 A1 | 3/2002 | Buddhikot et al. | |
| 2002/0046404 A1 | 4/2002 | Mizutani | |
| 2002/0073084 A1 | 6/2002 | Kauffman et al. | |
| 2002/0104096 A1 | 8/2002 | Cramer et al. | |
| 2002/0122430 A1 | 9/2002 | Haberman et al. | |
| 2002/0144262 A1 | 10/2002 | Plotnick et al. | |
| 2002/0150239 A1 | 10/2002 | Carny et al. | |
| 2003/0004804 A1 | 1/2003 | Landsman et al. | |
| 2003/0229900 A1 | 12/2003 | Reisman | |
| 2004/0022391 A1 | 2/2004 | O'Brien | |
| 2004/0268384 A1 | 12/2004 | Stone | |
| 2005/0076368 A1 | 4/2005 | Lee | |
| 2005/0163229 A1 | 7/2005 | Okada et al. | |
| 2005/0193205 A1 | 9/2005 | Jacobs et al. | |
| 2005/0207569 A1 | 9/2005 | Zhang et al. | |
| 2006/0015637 A1 | 1/2006 | Chung | |
| 2006/0114985 A1 | 6/2006 | Linzer | |
| 2006/0122882 A1 | 6/2006 | Brown et al. | |
| 2006/0129907 A1 | 6/2006 | Volk et al. | |
| 2006/0288112 A1 | 12/2006 | Soelberg et al. | |
| 2007/0078712 A1 | 4/2007 | Ott, IV et al. | |
| 2007/0162571 A1 | 7/2007 | Gupta et al. | |
| 2007/0168542 A1 | 7/2007 | Gupta et al. | |
| 2007/0198416 A1 * | 8/2007 | Ye | 705/51 |
| 2007/0233891 A1 | 10/2007 | Luby et al. | |
| 2008/0005349 A1 | 1/2008 | Li et al. | |
| 2008/0059310 A1 | 3/2008 | Lettow et al. | |
| 2008/0141027 A1 | 6/2008 | Kim et al. | |
| 2008/0207182 A1 | 8/2008 | Maharajh et al. | |
| 2008/0215620 A1 | 9/2008 | Folgner et al. | |
| 2009/0003432 A1 | 1/2009 | Liu et al. | |
| 2009/0022172 A1 | 1/2009 | Haberman et al. | |
| 2009/0031424 A1 | 1/2009 | Ganesan et al. | |
| 2009/0063280 A1 | 3/2009 | Wurster et al. | |
| 2009/0150941 A1 | 6/2009 | Riedl et al. | |
| 2009/0172197 A1 | 7/2009 | Kalaboukis et al. | |
| 2009/0217316 A1 | 8/2009 | Gupta | |
| 2009/0257435 A1 | 10/2009 | Karlsson et al. | |
| 2009/0287841 A1 | 11/2009 | Chapweske et al. | |
| 2009/0300145 A1 | 12/2009 | Musayev et al. | |
| 2009/0327896 A1 | 12/2009 | Pall et al. | |
| 2010/0057926 A1 | 3/2010 | Cao et al. | |
| 2010/0095121 A1 | 4/2010 | Shetty et al. | |
| 2010/0100742 A1 | 4/2010 | Courington et al. | |
| 2010/0107200 A1 | 4/2010 | Drang et al. | |
| 2010/0118973 A1 | 5/2010 | Rodriguez et al. | |
| 2010/0129057 A1 | 5/2010 | Kulkarni | |
| 2010/0138892 A1 | 6/2010 | Meuninck et al. | |
| 2010/0161425 A1 | 6/2010 | Sideman | |
| 2010/0189131 A1 | 7/2010 | Branam et al. | |
| 2010/0205049 A1 | 8/2010 | Long et al. | |
| 2011/0029999 A1 | 2/2011 | Foti | |
| 2011/0071911 A1 | 3/2011 | Tung et al. | |
| 2011/0161181 A1 | 6/2011 | Esteve Asensio et al. | |
| 2011/0238507 A1 | 9/2011 | Ben-Rubi | |
| 2011/0246603 A1 | 10/2011 | Lee | |
| 2011/0246659 A1 | 10/2011 | Bouazizi | |
| 2011/0264506 A1 | 10/2011 | Grant et al. | |
| 2011/0287748 A1 | 11/2011 | Angel et al. | |
| 2012/0005312 A1 | 1/2012 | McGowan et al. | |
| 2012/0005313 A1 | 1/2012 | McGowan et al. | |
| 2012/0047542 A1 | 2/2012 | Lewis et al. | |
| 2012/0134355 A1 | 5/2012 | Vendrow et al. | |
| 2012/0167132 A1 | 6/2012 | Mathews et al. | |
| 2012/0179788 A1 | 7/2012 | McGowan | |
| 2012/0185530 A1 | 7/2012 | Reza | |
| 2012/0185608 A1 | 7/2012 | McGowan et al. | |
| 2012/0197419 A1 | 8/2012 | Dhruv et al. | |
| 2012/0198492 A1 | 8/2012 | Dhruv et al. | |

FOREIGN PATENT DOCUMENTS

| | | |
|---|---|---|
| GB | 2462732 A | 2/2010 |
| WO | WO 2010/025686 A1 | 3/2010 |
| WO | 2011/009205 A1 | 1/2011 |

OTHER PUBLICATIONS

Australian Patent Office, Examiners First Report on Patent Application No. 2010202741 for Unicorn Media, Inc., dated Aug. 9, 2010, 4 pages.

Ben Atallah, S., et al., "Dynamic Configuration of Multimedia Applications," IFIP International Federation for Information Processing, 2003, 18 pages.

International Search Report and Written Opinion of PCT/US2012/071669 mailed on Apr. 5, 2013, 74 pages.

International Search Report and Written Opinion of PCT/US2012/071629 mailed on Apr. 5, 2013, 92 pages.

Prangl, M. et al. "Towards QoS Improvements of TCP-Based Media Delivery," Networking and Services, 2008, ICNS 2008: Fourth International Conference on IEEE, Piscataway, NJ, USA, Mar. 16, 2008, 6 pages.

* cited by examiner

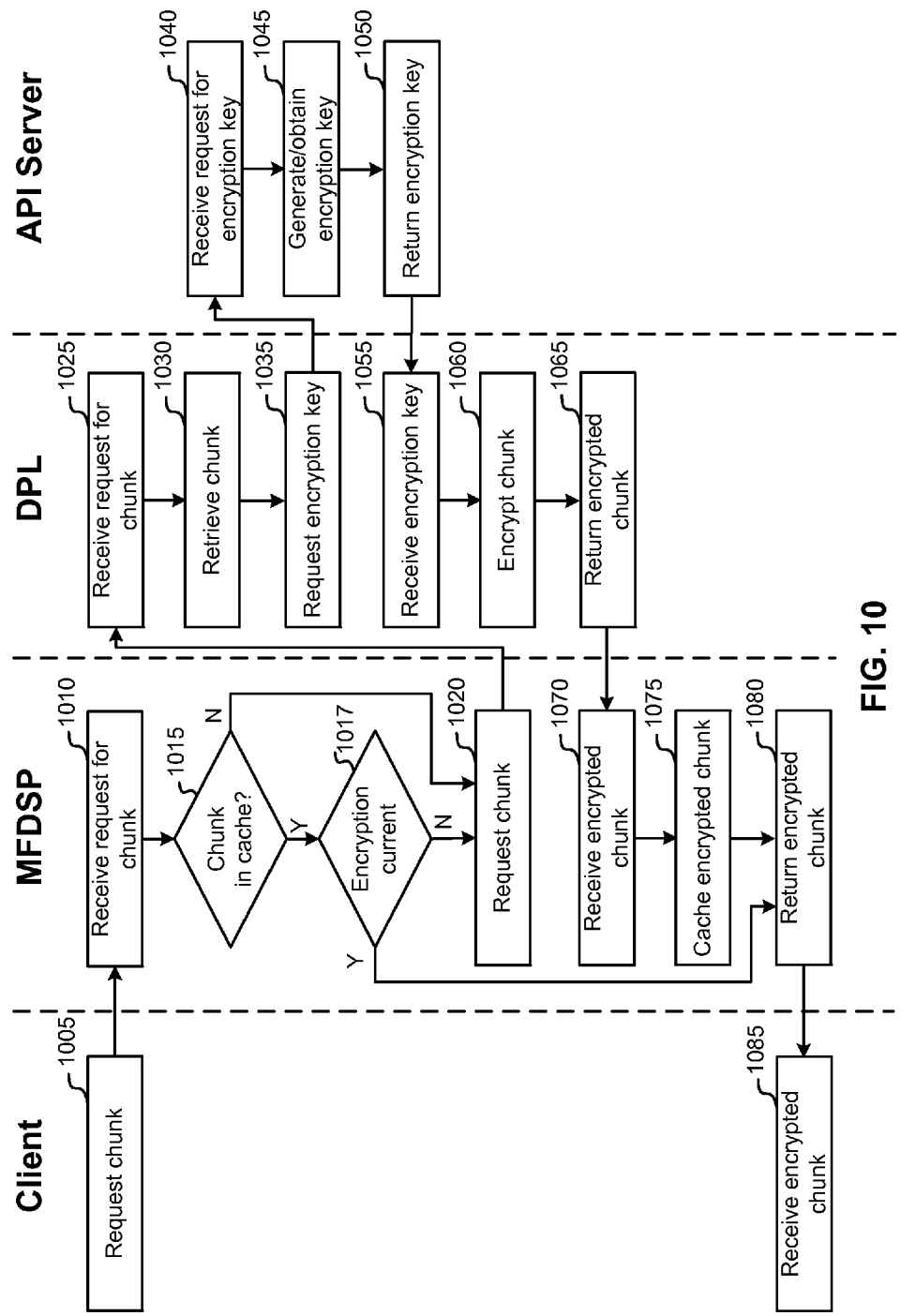

DYNAMIC ENCRYPTION

BACKGROUND OF THE INVENTION

This disclosure relates in general to cloud-based computer processing and, but not by way of limitation, to encrypting media for streaming.

The delivery of media over networks such as the Internet can be accomplished in many ways, including progressive downloading or streaming. Streaming is often preferred to progressive downloading because it offers additional features such as content protection and the ability to seek to undownloaded parts of a media file. The process of preparing a media file for streaming typically involves "chunking" the file, or dividing media files up into smaller segments for delivery. Information including where chunks may be accessed can be stored in an index file, or manifest. This index file can be delivered to a client, such as a media player application, for use in streaming.

The processes of chunking and indexing files for streaming present challenges to a media file delivery service provider or content provider desiring to host media files for streaming. For example, a significant amount of preprocessing is required to prepare media for streaming. Media content may be encoded into several different files to accommodate several different sub-streams. Each of these files typically are chunked, stored, and indexed before the media content is available for streaming. Where encryption is required, the chunks are additionally encrypted before they are stored. Such preprocessing leaves little flexibility for changing encryption keys.

BRIEF SUMMARY OF THE INVENTION

Systems and methods for encrypting a media file for streaming over a network are disclosed. These systems and methods may be part of a larger media servicing network that can be used to, among other things, process uploaded media content, provide it for streaming, and collect metric information regarding the streaming. The disclosed systems and methods provide for receiving requests for a media file or a chunk of a media file and responding to these requests by encrypting the requested chunks dynamically and providing the chunks to the requesting entity. These systems and methods, which can be utilized with a dynamic chunk generation and dynamic index file generation, enable a high degree of flexibility in streaming chunked media files and preclude the need to encrypt the chunks prior to streaming.

An example method for providing a plurality of encrypted segments of a media file over a data network, according to the disclosure, includes receiving a request for a first segment of the media file and retrieving the first segment of the media file. The first segment of the media file can comprise media content for playback over a period of time. The method further includes determining a first encryption key and creating an encrypted first segment of the media file by encrypting the first segment of the media file using the first encryption key. The encrypting the first segment of the media file can occur after receiving the request for the first segment of the media file. The method further includes providing the encrypted first segment of the media file, receiving a request for a second segment of the media file, and retrieving the second segment of the media file. The second segment of the media file can comprise media content for playback over a period of time. The method also includes determining a second encryption key and creating an encrypted second segment of the media file by encrypting the second segment of the media file using the second encryption key. The encrypting the second segment of the media file can occur after receiving the request for the second segment of the media file. Finally, the method includes providing the encrypted second segment of the media file.

The example method for providing the plurality of encrypted segments of the media file over the data network also can include one or more of the following features. The second encryption key can be different than the first encryption key. The requests for the first and second segments of the media file can be received from a Media File Delivery Service Provider (MFDSP), which can be a media file delivery service provider, media streaming services provider, cloud data services provider, or other media file delivery services provider. The encrypted first and second segments of the media file can be provided to the MFDSP. The receiving the requests for the first and second segments of the media file and the providing the encrypted first and second segments of the media file can occur during playback of the media file by a device communicatively linked to the data network. The determining the first encryption key can comprise generating the first encryption key. The generating the first encryption key can comprise using an algorithm received over a communication link.

The example method for providing the plurality of encrypted segments of the media file over the data network also can include one or more of the following additional features. Providing a first decryption key for decrypting the encrypted first segment of the media file. Determining the first encryption key can comprise requesting, over a communication link, the first encryption key, and receiving, over the communication link, the first encryption key. Determining the second encryption key can comprise requesting, over the communication link, the second encryption key, and receiving, over the communication link, the second encryption key. Determining the first encryption key comprises retrieving the first encryption key from data storage.

An example a non-volatile computer-readable storage medium, according to the description, can have instructions embedded thereon, which, when executed by a processor, cause the processor to perform the method for providing the plurality of encrypted segments of the media file over the data network described above.

An example a server for communicating, via a network, a media file having a plurality of segments, according to the description, can include a network interface, a memory configured to store one or more of the plurality of segments, and a processor communicatively coupled with the memory and the network interface and configured to cause the server to receive, using the network interface, a request for a first segment of the media file and retrieve the first segment of the media file from the memory. The first segment of the media file can comprise media content for playback over a period of time. The processor also can be configured to cause the server to determine a first encryption key, and create an encrypted first segment of the media file by encrypting the first segment of the media file using the first encryption key. The encrypting the first segment of the media file can occur after receiving the request for the first segment of the media file. The processor also can be configured to cause the server to provide, using the network interface, the encrypted first segment of the media file, receive, using the network interface, a request for a second segment of the media file, and retrieve the second segment of the media file from the memory. The second segment of the media file can comprise media content for playback over a period of time. The processor also can be configured to cause the server to determine a second encryption key and create an encrypted second segment of the media file by encrypting the second segment of the media file using the second encryption key. The encrypting the second segment of the media file can occur after receiving the request for the second segment of the media file. Finally, the processor can be configured to cause the server to provide, using the network interface, the encrypted second segment of the media file.

The example server for communicating, via the network, the media file having the plurality of segments, can include one or more of the following features. The processor can be configured to cause the server to receive the requests for the first and second segments of the media file from a Media File Delivery Service Provider (MFDSP). The processor can be configured to cause the server to provide the encrypted first and second segments of the media file are to the MFDSP. The processor can be configured to cause the server to receive the requests for the first and second segments of the media file and provide the encrypted first and second segments of the media file during playback of the media file by a device communicatively linked to the network. Determining the first encryption key can comprise generating the first encryption key.

The example server for communicating, via the network, the media file having the plurality of segments, also can include one or more of the following additional features. The processor can be configured to cause the server to receive an algorithm via the network interface, and use the algorithm to generate the first encryption key. The processor can be configured to cause the server to determine the first encryption key by requesting, using the network interface, the first encryption key, and receiving, using the network interface, the first encryption key. The processor can be configured to cause the server to determine the second encryption key by requesting, using the network interface, the second encryption key, and receiving, using the network interface, the second encryption key. The processor can be configured to cause the server to determine the first encryption key by retrieving the first encryption key from the memory.

An example system for securely communicating, with a network, a media file, according to the disclosure, can include a data storage configured to store the media file, and a processing server communicatively coupled with the data storage. The processing server can be configured to receive a request for a first segment of the media file, retrieve at least a portion of the media file from the data storage, and generate the first segment of the media file. The first segment of the media file can comprise media content for playback over a period of time. The processing server also can be configured to determine a first encryption key and create an encrypted first segment of the media file by encrypting the first segment of the media file using the first encryption key. The encrypting the first segment of the media file can occur after the request for the first segment of the media file is received. Additionally, the processing server can be configured to provide the encrypted first segment of the media file, receive a request for a second segment of the media file, and generate the second segment of the media file. The second segment of the media file can comprise media content for playback over a period of time. The processing server further can be configured to determine a second encryption key and create an encrypted second segment of the media file by encrypting the second segment of the media file using the second encryption key. The encrypting the second segment of the media file can occur after receiving the request for the second segment of the media file. Finally, the processing server can be configured to provide the encrypted second segment of the media file.

The example system for securely communicating, with the network, the media file can include one or more of the following features. A media caching server configured to send the requests for the first and second segments of the media file, via the network, to the processing server, receive the encrypted first and second segments of the media file, via the network, from the processing server, and store the encrypted first and second segments of the media file in a memory. The media caching server can be further configured to provide the encrypted first and second segments of the media file to a device communicatively coupled with the media caching server. The media caching server can be configured such that the media caching server will not send the requests for a segment of the media file via the network to the processing server if the media caching server has the segment of the media file stored in the memory.

BRIEF DESCRIPTION OF THE DRAWINGS

The present disclosure is described in conjunction with the appended figures:

FIG. 10 is a simplified swim lane flowchart describing the interaction of components in a system configured to provide dynamically encrypt chunks of media for media streaming.

Figure 1:
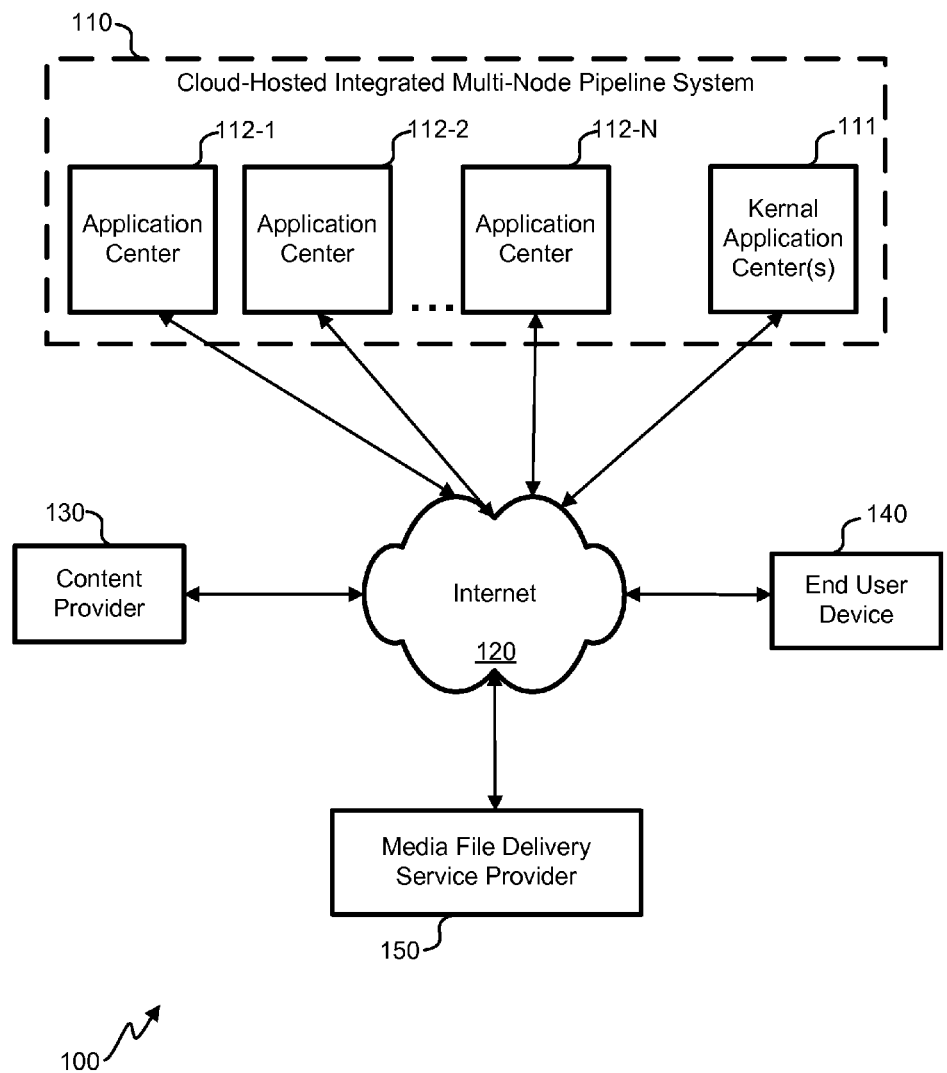
FIG. 1 is a block diagram of a media servicing system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The increased availability of media content over data communications networks such as the Internet has mirrored the increased bandwidth for these networks. Because media has recently taken a more prominent role in data communications, the distribution of media and the data associated with such distribution has become increasingly important, particularly to media content providers. Media streaming has become a widely-used method of media distribution, but the preprocessing associated with streaming can be burdensome. Certain protocols, including forms of Hypertext Transfer Protocol (HTTP) streaming, require chunking and storing the chunked media files, and generating a corresponding index file(s) (also known as a "manifest" file). In a traditional approach, this can involve a large amount of preprocessing.

Preprocessing media for streaming traditionally involves chunking media files, storing the chunks, then creating corresponding index files to indicate where chunks may be located to download for streaming. Streaming protocols often provide for frequently updating an index file for instances where the corresponding media is frequently updated, such as during live streaming. Thus, an index file does not need to contain all chunks for a requested media file. In addition, because media files are frequently stored in a format that requires little additional processing to chunk, the chunks can be created in real time, during the streaming of a media file. The systems and methods disclosed in U.S. patent application Ser. No. 12/976,883, entitled "DYNAMIC CHINKING FOR MEDIA STREAMING," and U.S. patent application Ser. No. 12/976,890, entitled "DYNAMIC INDEXING FOR AD INSERTION IN MEDIA STREAMING," which are incorporated herein by reference, take advantage of these features to enable dynamic index file creation and dynamic media file chunking.

In instances where a media provider desires secure streaming, preprocessing traditionally involves encrypting chunks of a media file as well. Such preprocessing can result in a large amount of stored encrypted chunks that can prove burdensome to manage. For example, if a content provider of a media file desires to update or change the encryption key(s) used to encrypt the stored encrypted chunks corresponding to the media file, each chunk would either need to be decrypted and re-encrypted or replaced altogether with a new chunk, encrypted with the new encryption key.

In contrast, the techniques provided herein enable dynamic encryption that can allow a system to encrypt chunks of a media file in real time, as the chunks are requested by a client streaming the media file. Such functionality can provide flexibility to a content provider to provide the encryption key(s) used to encrypt a media file at any time, including while media file is streaming to a client. In other embodiments, another entity, such as the content distributor, can provide the encryption key(s). This dynamic encryption can be utilized in a variety of systems, including those that preprocess and store chunks of a media file, as well as those that can dynamically create the chunks. Moreover, techniques described herein are not limited to encrypting chunks of a media file, but also can be utilized to encrypt whole files as well as non-media files and/or chunks of non-media files. Furthermore, the techniques described herein may also return a media file that has been dynamically stitched together from many chunks, which, to a client, can appear like a contagious file for continuous streaming protocols (Real Time Messaging Protocol (RTMP), Real Time Streaming Protocol (RTSP), etc.) as well as for progressive download.

The index file(s) utilized to access chunks of a media file (or whole files, in some embodiments) can vary in content and format, depending on protocols utilized by a media player application configured to play the streamed media file. For example, different index files can include information corresponding to a different number of chunks and/or chunks of media having differing playback parameters (e.g., bit rate, resolution, frame rate, etc.). Despite the differences in format and content, the techniques described herein can be utilized to enable any number of clients, having different index file requirements, to utilize a single Uniform Resource Locator URL (URL), or other indicator, to retrieve the index file corresponding to a particular media file in a format suitable for that client. As a result, a media content provider can provide a single URL for each media file, regardless of the type of client and/or platform requesting the media file.

Furthermore, when a client uses the URL to request a media file, an index file generator receiving the request can determine whether advertisements are to be played during the playback of the media file, and enable a content provider to select the advertisements to be played. Moreover, the content provider further can provide the index file generator with one or more beaconing URLs to insert into an index file, which can serve as beacons to indicate to the content provider that certain content, such as advertisements, is being and/or has been played. A content provider can find the beaconing information to be vital in determining the value of the media.

The beaconing information may be used for various purposes. For example, it may be used to determine the state of a client (e.g., paused, skipping certain content, playing back certain content, etc.), which can be used in behavioral advertisement targeting and enforcement of session advertisement behavior, adjusting advertisement content and playback based on the behavior of a user. The state of a client also may be used to support individual encryption keys in an encryption scheme and allow the index file generator to return secure URLs (e.g., time expiring or Internet Protocol (IP) allowed) for chunks to support functions such as payment services.

While the above embodiments may be implemented in a variety of different systems, some particular embodiments may be implemented as part of a media service system. FIG. 1 is a block diagram illustrating a media servicing system 100, according to some embodiments of the present invention. The system may deliver media content to the end user device 140 through a network such as the Internet 120. The end user device 140 can be one of any number of devices configured to receive media over the Internet 120, such as a mobile phone, tablet computer, personal computer, portable media device, etc. A media file provided by a content provider 130 can be processed and indexed by cloud-hosted integrated multi-node pipelining system (CHIMPS) 110, and further stored a media file delivery services provider (MFDSP) 150.

Additionally or alternatively, the CHIMPS 110 may also be adapted to store the media file.

The media servicing system further enables a content provider 130 or other entity to gather information regarding user behavior during media playback. For example, a content provider 130 can be provided with data indicating that end users tend to stop watching a video at a certain point in playback, or that users tended to follow links associated with certain advertisements displayed during playback. With this data, a content provider 130 can adjust factors such as media content, advertisement placement and content, etc., to increase revenue associated with the media content and provide the end user device 140 with a more desirable playback experience.

End user device 140 can request a media file to stream with a client program executed by the end user device 140. The client program can be, for example, a media player, browser, or other application adapted to request and/or play media files. In response to a request for a media file, the CHIMPS 110 can utilize any number of application centers 112 and/or kernel application center(s) 111 to provide the client program with a data object concerning the requested media file. The data object can include information about the media file, including where the media file can be located, such as within the MFDSP 150 or within the CHIMPS 110 itself. Location information may be provided by a URL or other indicator. During playback of the media file, the CHIMPS 110 can collect data regarding the playback through beaconing provided by a client program executed by the end user device 140 and/or indexing service from within the CHIMPS and/or MFDSP. The CHIMPS 110 can subsequently provide the data and/or any analytics information derived from the data to the content provider 130. Additionally, as discussed below, the content provider 130 can provide additional beaconing URLs to an index file generator with which the content provider can determine whether particular content has been viewed.

Figure 2A:
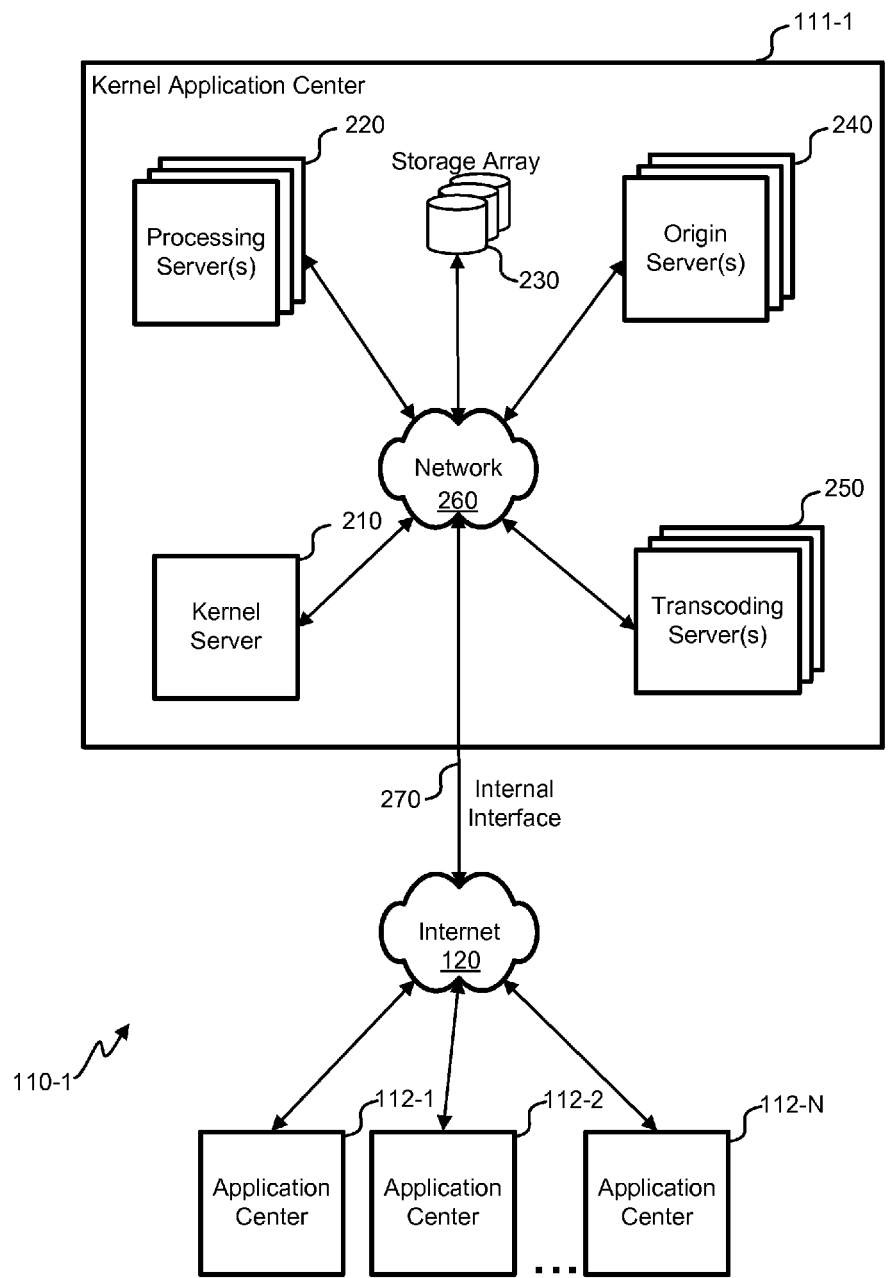
FIG. 2A is a block diagram of an embodiment of a kernel application center connected with application centers.

FIG. 2A is a block diagram illustrating an embodiment of a kernel application center 111-1 connected with application centers from within the CHIMPS 110-1. The kernel application center 111-1 and application centers 112 can be geographically distant and can be connected via the Internet 120, wide area network (WAN), and/or other data communication network. Because application centers can be geographically separated, DNS services (not shown) can be used to allow an end user device 140 to connect to the nearest available application center 112. The kernel application center 111-1 can connect with application centers 112 within the CHIMPS 110-1 through an internal interface 270, thereby enabling the application centers 112 access to the various components within the kernel application center 111-1.

Components within the kernel application center 111-1 can communicate through network 260 such as a local area network (LAN) and can include one or more origin servers 240 and a storage array 230 with which data objects and/or media files may be stored and distributed. The storage array 230 may also be utilized by services running on processing server(s) 220 and/or transcoding server(s) 250 that may require temporary or long-term storage. Kernel server 210 can utilize processing server(s) 220, transcoding server(s) 250 to provide various functional capabilities to the CHIMPS 110.

For example, as described in more detail below, the CHIMPS 110-1 can provide transcoding service for media files provided by a content provider 130 for syndication. Such a service can allow a content provider 130 to upload a media file to an application center 112, after which the application center 112 would notify the kernel server 210 that the media file has been uploaded. The kernel server can then notify services running on the processing server(s) 220 of the upload. These services can utilize transcoding server(s) to transcode the media file, which can then be moved to a MFDSP and/or stored locally by storage array 230 and origin server(s) 240. Services running on the processing server(s) 220 can also update the associated data object stored by the storage array 230 and origin server(s) 240.

Figure 2B:
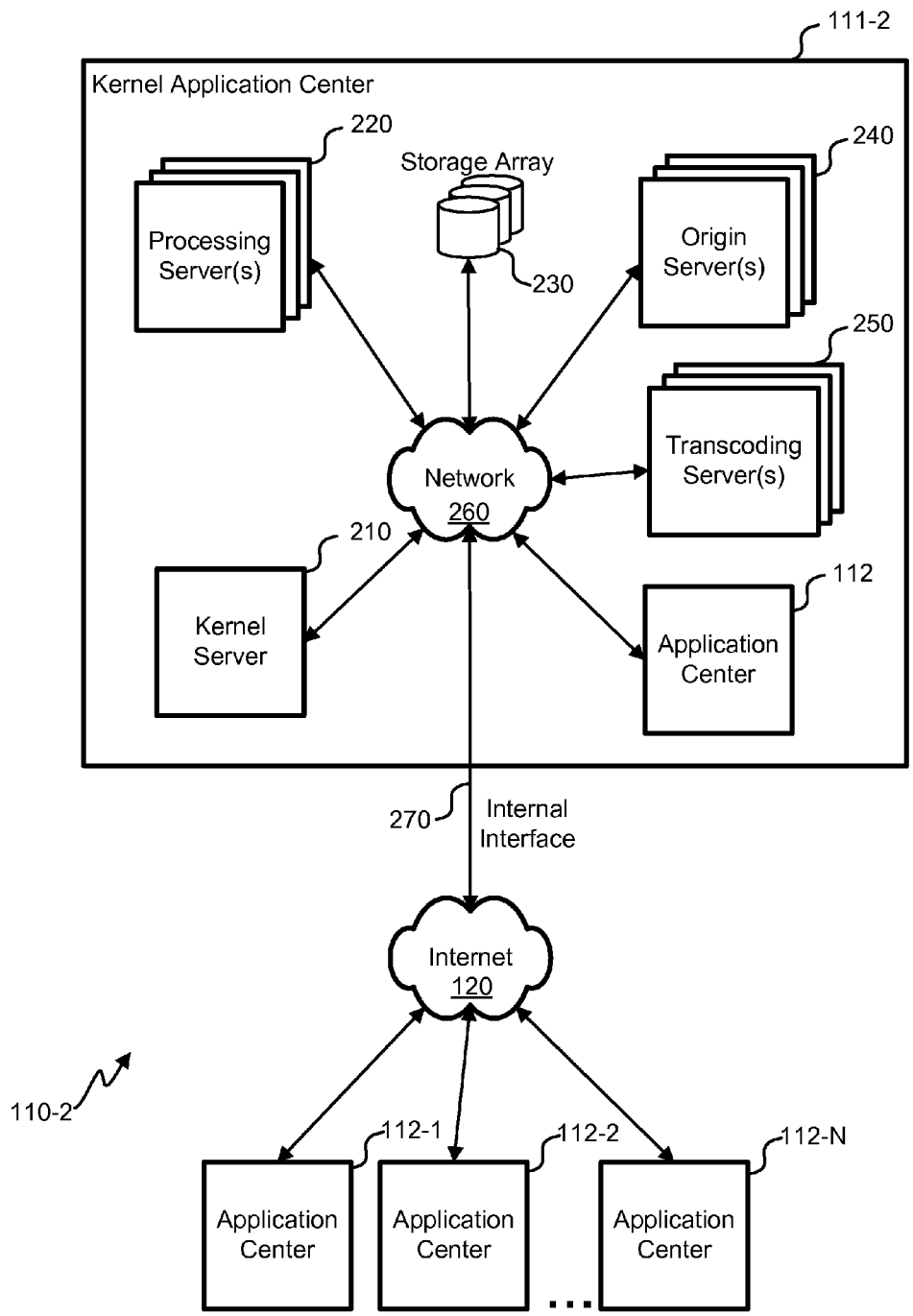
FIG. 2B is a block diagram of an alternative embodiment of a kernel application center.

FIG. 2B is a block diagram illustrating an alternative embodiment of a kernel application center 111-2. In addition to the components of the embodiment of FIG. 2A, this embodiment incorporates an application center 112 within the kernel application center 111-2. The application center 112 incorporated within kernel application center 111-2 may be located at or near the other components of the kernel application center 111-2, and can be communicatively connected to the other components via network 260. The incorporated application center 112 can therefore have faster access to kernel application center functionality because it does not need to communicate over long distances. In consideration of this advantage, it will be understood that the CHIMPS 110 can include multiple kernel centers with one or more application centers incorporated therein. Additionally or alternatively, components of the kernel application center may be incorporated into one or more application centers 112 in the CHIMPS 110 to provide quicker access to certain functionality.

Figure 3:
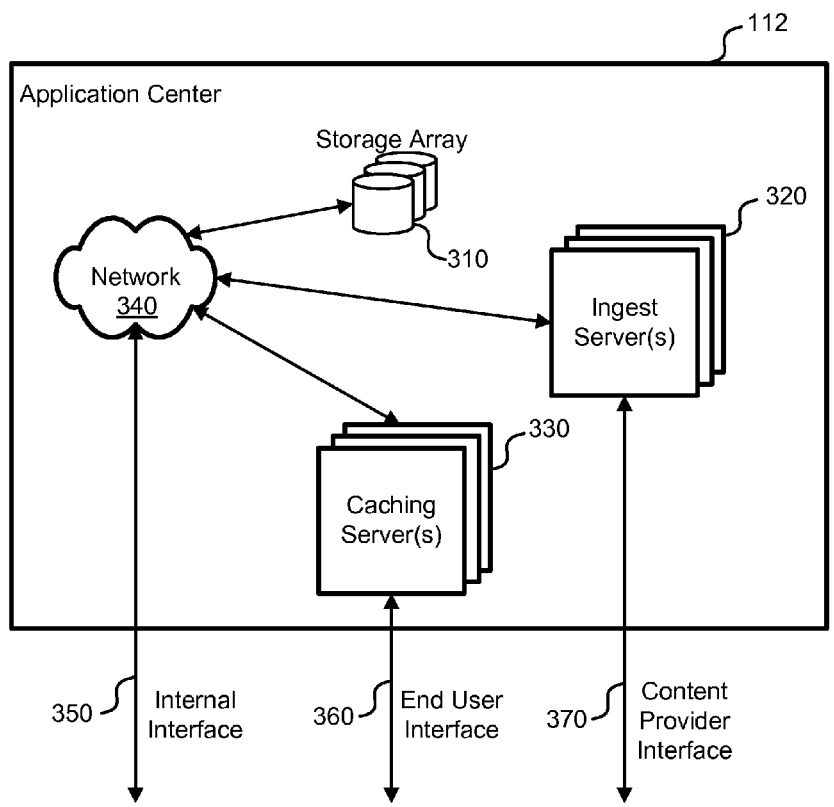
FIG. 3 is a block diagram of an embodiment of an application center.

FIG. 3 is a block diagram illustrating an embodiment of an application center 112. The application center 112 can include caching server(s) 330 and a storage array 310 for storing and distributing data objects of media files requested by end user devices through end user interface 360. Caching server(s) 330 and storage array 310 can also be used to collect, process, and/or store metrics information from beaconing data, media chunk requests, and/or other data sources, including data collected through end user interface 360. The application center can further include ingest server(s) 320 for ingesting uploaded media files from a content provider 130 through a content provider interface 370. The media files may be stored on the storage array 310. As with the kernel application center 111, the components of the application center 112 can be communicatively linked through a network 340, such as a LAN. The application center can further include an internal interface 350, providing a communication link from the application center to the rest of the CHIMPS. It is through internal interface 350, for example, that media files stored on storage array 310 can be made available to a kernel application center 111 for services such as transcoding.

Figure 4:
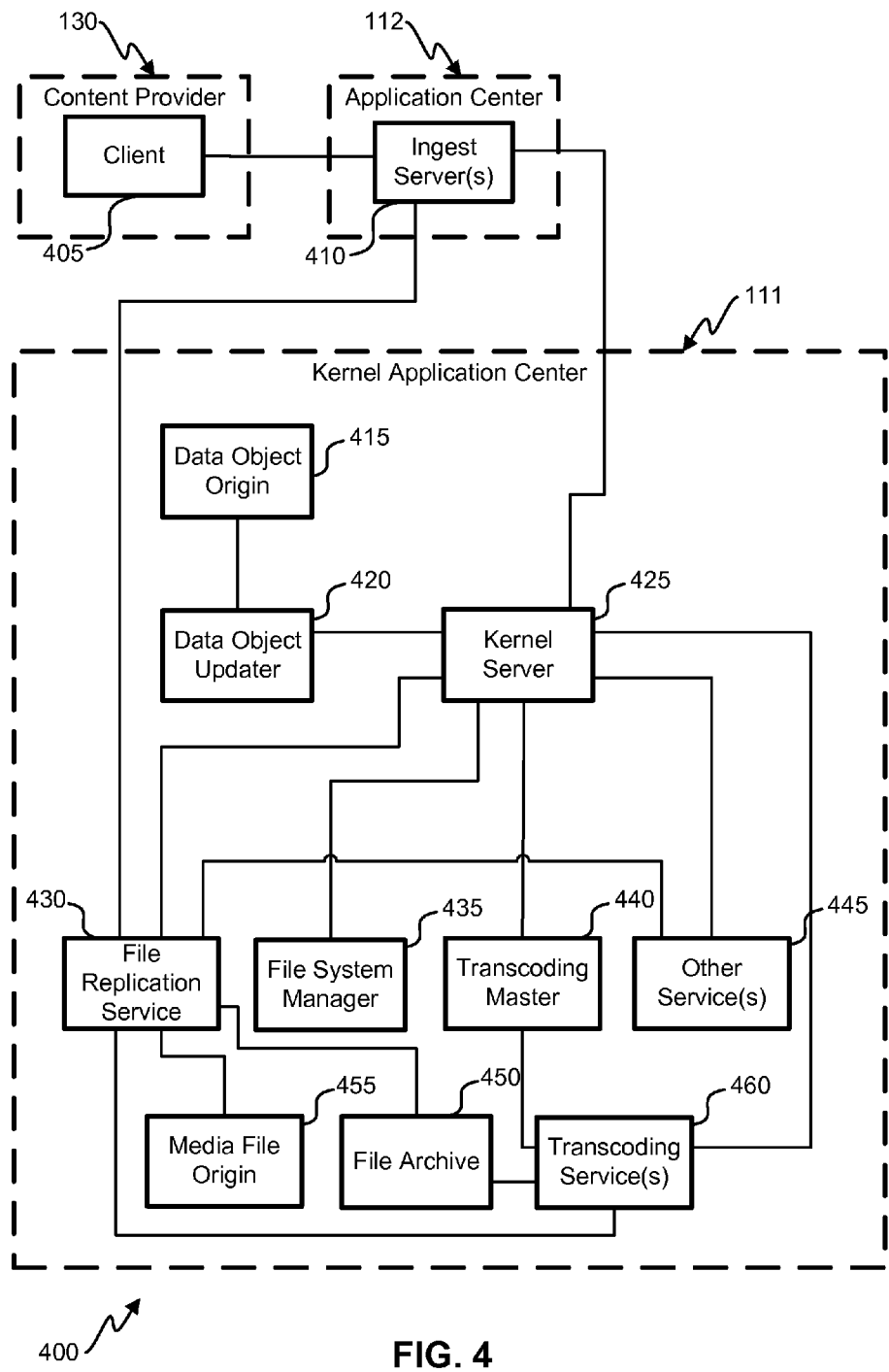
FIG. 4 is a block diagram of processes and objects utilized by a cloud-hosted integrated multi-node pipelining system for media ingestion.

FIG. 4 is a block diagram 400 of processes and objects utilized by the CHIMPS 110 for media ingestion, according to some embodiments. Although FIG. 4 further indicates the physical systems in which my execute or store these processes and objects, it will be understood that the processes and objects disclosed may be executed or stored on more than one system, including systems not disclosed in FIG. 4. In other words, the processes and objects shown in FIG. 4 allow for a variety of implementations through one or more of hardware, software, firmware, microcode, etc.

Media can be ingested into the CHIMPS 110 when a content provider 130 uploads a media file to ingestion server(s) 410 in an application center 112 by utilizing a client 405. The client 405 can be a stand-alone application or browser based, for example, and can communicate with ingest server(s) 410 through an application programming interface (API) configured for the ingestion of media files.

Ingest server(s) 410 can communicate with devices in the kernel application center 111 executing programs such as kernel server 425 and file replication service 430. The kernel server 425 can be configured organize the workflow among services such as transcoding 440 file system manager 435, and other services 445 (e.g., analytics, dynamic API, etc.) Upon a particular event, for example, the kernel server can be configured to notify the relevant services of the event, causing the services to process tasks associated with the event.

The file replication service 430, under direction of the kernel server 425, can coordinate the movement of the media files between services. For example, retrieving the uploaded media file from the ingest server(s) 410 and storing it on the file archive 450, or retrieving transcoded media files from transcoding server(s) 460 and storing them in the media file origin.

The data object updater 420 keeps the data object origin 415 up to date in response to any changes in the system. When, for example, a file is uploaded, transcoded, and stored in media file origin 455, the location and other metadata concerning the transcoded media files need to be created or updated in the data object origin 415 to ensure an end user device that accesses the object in the data object origin 415 has the correct information regarding the related media file. Because the data object updater 420 receives updates from the kernel server 425 (which is notified when a transcoded media file is stored in the media file origin 455, the system ensures the data objects in the data object origin are constantly up to date.

The upload of a media file to the ingest server(s) 410, as described above, can provide an example of how the kernel server 425 may coordinate workflow. For instance, in response to the upload, the ingest server(s) 410 can notify the kernel server 425 that a media file has been uploaded. The kernel server 425 informs the file replication service 430 of the uploaded media file, and the file replication service 430 moves the uploaded media file into the file archive 450 and notifies the kernel server 425 of the move. In response, the kernel server 425 notifies the file replication service 430, the file system manager 435, and the transcoding master 440 of the move. The file replication service 430 then will know it can delete the uploaded media file from the ingest server(s) 410, the file system manager 435 will update the file system accordingly, and the transcoding master 440 will notify transcoding service(s) 460 of different transcoding tasks to be performed. The transcoding service(s) 460 can then retrieve the uploaded media file from the file archive 450 to create transcoded media files. The transcoding service(s) 460 notify the kernel server 425 once transcoding is complete, and the kernel server 425 relays this information to the file replication service 430. The file replication service 430 then takes the transcoded media files from the transcoding services 460 and moves them to the media file origin 455. Once the file replication service 430 notifies the kernel server 425 of the move, the kernel server 425, in turn, notifies the file replication service 430 and the data object updater 420. The data object updater 420 which updates the data object origin 415 accordingly, and the file replication service 430 deletes the transcoded media files from the transcoding services 460.

The modular nature of the system enables all tasks associated with an event to be completed quickly. As illustrated in the example above, workflow relating to a particular event, such as a media file upload, can be spread among the various services simultaneously. Moreover, because the system's modularity enables it to be scaled to accommodate differing hardware capacities, and because the system can be configured to dynamically allocate hardware to different services according to the needs of the system, the speed of completing tasks relating to a particular event can further be increased.

For example, a server of the CHIMPS 110 can be configured to dynamically switch its purpose based on external conditions such as load and overall system performance, providing functions such as transcode, upload, metrics collection, application web service, and more, on an as-needed basis.

Figure 5:
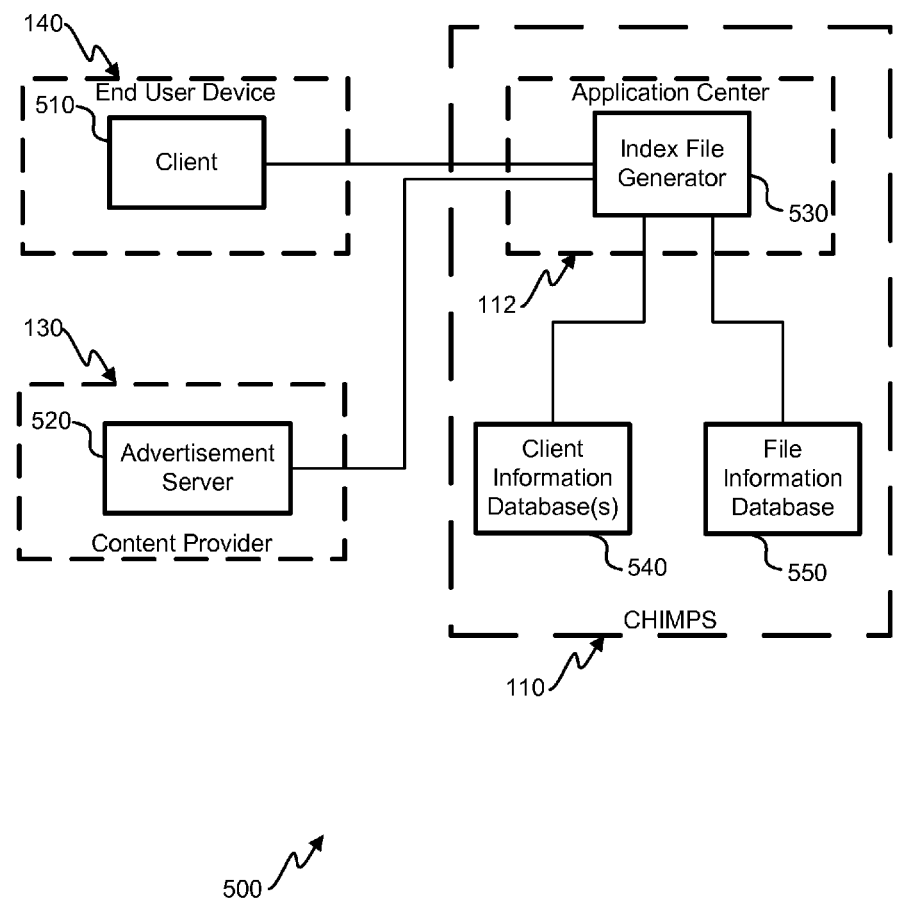
FIG. 5 is a system for providing an appropriate index file to any of a variety of clients utilizing a single URL.

Embodiments of such systems may include other systems that manage various requests from end users. For example, a system for providing an appropriate index file to any of a variety of clients utilizing a single URL. Referring to FIG. 5, an embodiment of such a system 500 is shown. Media may be streamed to end user device 140 though a client 510. As mentioned above, the client 510 can be stand-alone media player, a plug-in, a browser, or other application, which can be executed on a personal computer or other electronic device.

An index file (i.e. manifest file) generator 530 can be a program instantiated for media streaming to a particular client 510. The index file generator 530 can be executed on a server or other computing device within an application center 112 of the CHIMPS 110. Index files generated by the index file generator can include a wide variety of information such as starting, ending, and or run times for media chunks and locations for media chunks. This information can be embedded in a single string of data, such as a URL or other type of URI. If media includes various sub-streams (e.g., streams with alternative bitrates, captions, alternative languages, etc.) the index file can include data for chunks corresponding to each of the alternative sub-streams, as well as information regarding the bitrate and/or other unique information for each stream. Alternatively or in addition, index files indicating alternative sub-streams may be separate from index files indicating one or more media chunks for streaming.

It should be understood that the index file can further comprise a wide variety of formats, which can depend on a particular streaming protocol utilized by the client 510. HTTP streaming may, for example, require index files to comprise one or more of M3U, M3U8, XML, and XML-based formats. Of course, other formats can be used in accordance with relevant streaming protocols.

The index file generator 530 can determine the relevant streaming protocol from information included in a request sent from the client 510 to stream a media file. For example, a client 510 can utilize a URL, obtained from a content provider 130 or other entity to stream a particular media file, to request the media file from the index file generator 530. In addition to the URL, the request can included information regarding the identification of the client 510 (or "client ID"; e.g., a user agent identification in a request header) that the index file generator 530 can use to determine the proper format and content of an index file for the client 510.

A proper format and content of an index file can be determined in numerous ways. For example, the index file generator 530 itself may recognize the type of client from the client ID and determine a proper index file type accordingly. The index file generator 530, therefore, may include information regarding common client IDs and/or special use cases for which particular index file types are used. This information can be updated periodically, and/or as index file types are determined for different client IDs.

Alternatively, the index file generator 530 can access a client information database(s) 540 to determine the proper index file type. Such a database(s) can be located within the CHIMPS 110 (shown) and/or external to the CHIMPS 110 (not shown), depending on desired functionality. One example of an external client information database(s) 540 is the Wireless Universal Resource FiLe (WURFL), a device description repository maintained by ScientiaMobile, Inc. The proper index file type can be determined by identifying a index file type known to work for a particular client ID or matching a client ID to an index file type based on a profile of capabilities associated with the client ID.

If a proper index file type cannot be determined, the index file generator 530 can provide an index file of a default index file type. The default index file type can include information for streaming the requested media file using a basic media stream compatible with virtually any media client. For example, parameters associated with a basic video stream could include a resolution of 160×120, a 3GP (Third Generation Partnership Project file format) multimedia container format, and/or a streaming bit rate of 100 kilobits per second (kbps).

The index file generator 530 further can utilize a file information database 550 in the creation of an index file. The file information database 550 can provide information regarding the requested media file (e.g., length, genre, author, etc.) as well as information regarding whether any advertisements are to be shown during the playback of the requested media file. If advertisements are to be shown during the playback of the requested media file, the database further can provide points at which advertisements are to be played during playback of the media file by the client.

An advertisement server 520, which can be maintained by a content provider 130, can provide the index file generator 530 with additional information regarding advertisements to be shown during the playback of the requested media file. For example, the index file generator 530 can determine, using information from the file information database 550, that three video advertisements are to be shown at certain points during the playback of a particular video file. The index file generator 530 then can request information from the advertisement server 520 regarding which advertisements to show. (This can be in the form of three different requests, or a single request, depending on the desired functionality of the system.) Moreover, the index file generator 530 can use the forwarded IP address and forwarded user agent of the client to identify the client, thereby allowing the content provider 130 to provide customized advertisements for the client. The advertisement server 520 can specify the advertisements to show (if an advertisements have been previously uploaded to the CHIMPS, and the index file generator can receive metadata regarding the advertisements from the file information database 550. Alternatively, the advertisements may be uploaded to and chunked by the CHIMPS 110 after the index file generator 530 requests the information from the advertisement server 520 regarding which advertisements to show In this latter case, metadata regarding the advertisements would also be extracted and used in the creating of the index file. Regardless of when the advertisements are uploaded to the CHIMPS 110, the advertisement server 520 enables a content provider 130 to traffic new advertisements into the playback of a media file shortly before the index file is generated, which can occur shortly before or even during the playback of a media file.

In addition to providing information regarding advertisement content, the advertisement server 520 can designate certain URLs in the index file for beaconing. These beaconing URLs can be similar to normal URLs of an index file, but with additional information attached, designating it as a providing a "beacon" to report back to the content provider 130. The content provider can use these beacons to determine, among other things, if a particular advertisement is played. For example, a beaconing URL can be a redirect URL included in a request for a first chunk of an advertisement. The request, which initially is directed to an API server of the CHIMPS 110, is interpreted as a beacon by the API server and added to a list of items for which the API server requests of the advertisement server 520 (or other system of the content provider 130). The beacon itself can be, for example, a getRequestURL( ) or similar request that the advertisement server 520 can use to determine that a particular URL was made. The API server can use the forwarded IP address and forwarded user agent of the client to help ensure that the content provider 130 can correctly determine that a beacon corresponds with a request from a particular client 510. The API server also can redirect the client to a particular media file delivery service provider (MFDSP) (or other system hosting the requested chunk) to receive the requested chunk. In alternative embodiments, the content provider 130 can provide additional beaconing URLs that can be used to provide beaconing information regarding the playback of the media file itself. Through the use of such beaconing URLs, the content provider 130 to is able to provide its own beaconing data in addition or as an alternative to any beaconing data gathered by the CHIMPS 110.

The index file generator 530 then uses the information regarding the client ID, the requested media file, the advertisement(s) to be shown during playback of the media file, and the points of the media file at which the advertisement(s) are to be played, to create an index file of the right index file type to return to the client 510. As indicated above, the index file can include, among other things, a number of URLs indicating the location of each chunk of the media file to be played by the client 510, as well as chunks of the advertisement(s). The chunks of the advertisement(s) are included in an manner such that they are shown at a point(s) during the playback of the media file corresponding to the points designated by the file information database 550. Additionally, the index file can include one or more beaconing URLs which, when used, can be indicative of the playback of an advertisement as discussed above.

The URLs provided by an index file additionally can direct a client 510 to additional index files. For example, under certain adaptive bit rate streaming protocols, a first index file typically can include a number of URLs to additional index files, where each additional index file corresponds to a particular bit rate for streaming. The client 510 then can choose a bit rate based on one or more factors such as connection speed, device type, etc. Other streaming rates (bytes, etc.) may be used additionally or alternatively.

To this end, the index file generator 530 can be configured to create an index file that provides the client 510 with a particular set of bit rates adapted to the client's circumstances. The client's circumstances not only can include the type of end user device 140 (also referred to herein as "device type") on which the client is running, but also the type of network to which the device is connected, among other things. These circumstances may be determined from a request header provided by the client along with a URL, and/or they may be determined utilizing other data obtained from and/or regarding the client 510. (The index file generator 530, for example, can determine that the Autonomous System (AS) number of a particular client's IP address is associated with a provider of a mobile wireless network.) Because the set of bit rates provided in the index file provides a customized selection for the client 510, the resulting playback can be optimized to provide the best user experience.

TABLE 1

Example Bit Rates for Certain Device/Network Types

| | | Device/Network Type | | | |
|---|---|---|---|---|---|
| | | Smart Phone/ Mobile Wireless Network | Smart Phone/ Wired Network | Tablet/ Mobile Wireless Network | Tablet/ Wireless Network |
| Streaming Bit Rate (kbps) | 1200 | | | X | X |
| | 800 | | | (X) | X |
| | 600 | X | (X) | X | (X) |
| | 400 | (X) | X | | X |
| | 200 | X | X | | X |
| | 100 | X | X | | X |
| | 64 | X | X | X | X |

Table 1, provided merely as an example, illustrates the different sets of streaming bit rates an index file can make available to a client, based on the device type and the network type. Not only can the index file include a selection of available bitrates, indicated by "X", but the index file further can designate an initial bit rate, indicated by "(X)", for the client 510. The client can then choose to steam the media file using the initial bit rate designated by the index file, or it may choose to stream the media file using one of the other bit rates provided in the index file. Alternatively, if the client 510 does not utilize an adaptive bit rate protocol, the index file generator can provide an index file of a single bit rate, where the single bit rate can be determined based on device type, network type, etc.

For example, an index file for a smart phone connected to a mobile wireless network (e.g., a wireless carrier for mobile phones and other wireless devices) can provide URLs for streaming a requested media file at 600, 400, 200, 100, and 64 kbps, where 400 kbps is designated as the initial rate at which the client can begin streaming the media file. However, if a smart phone is connected with a wired network (e.g., a cable or DSL internet connection), including a wireless local area network (LAN) connected to the internet through a wired network, the index file may provide the same set of URLs for streaming the requested media file, but designate a higher initial bit rate at which the client can begin streaming the media file. On the other hand, because a tablet computer may have a monitor capable of displaying higher-quality resolutions associated with a higher bit rate, the index file can provide a tablet computer with different sets of bit rates and different starting bit rate designations, including higher bit rates, that are not included in an index file provided to a client 510 running on a smart phone.

Figure 6A:
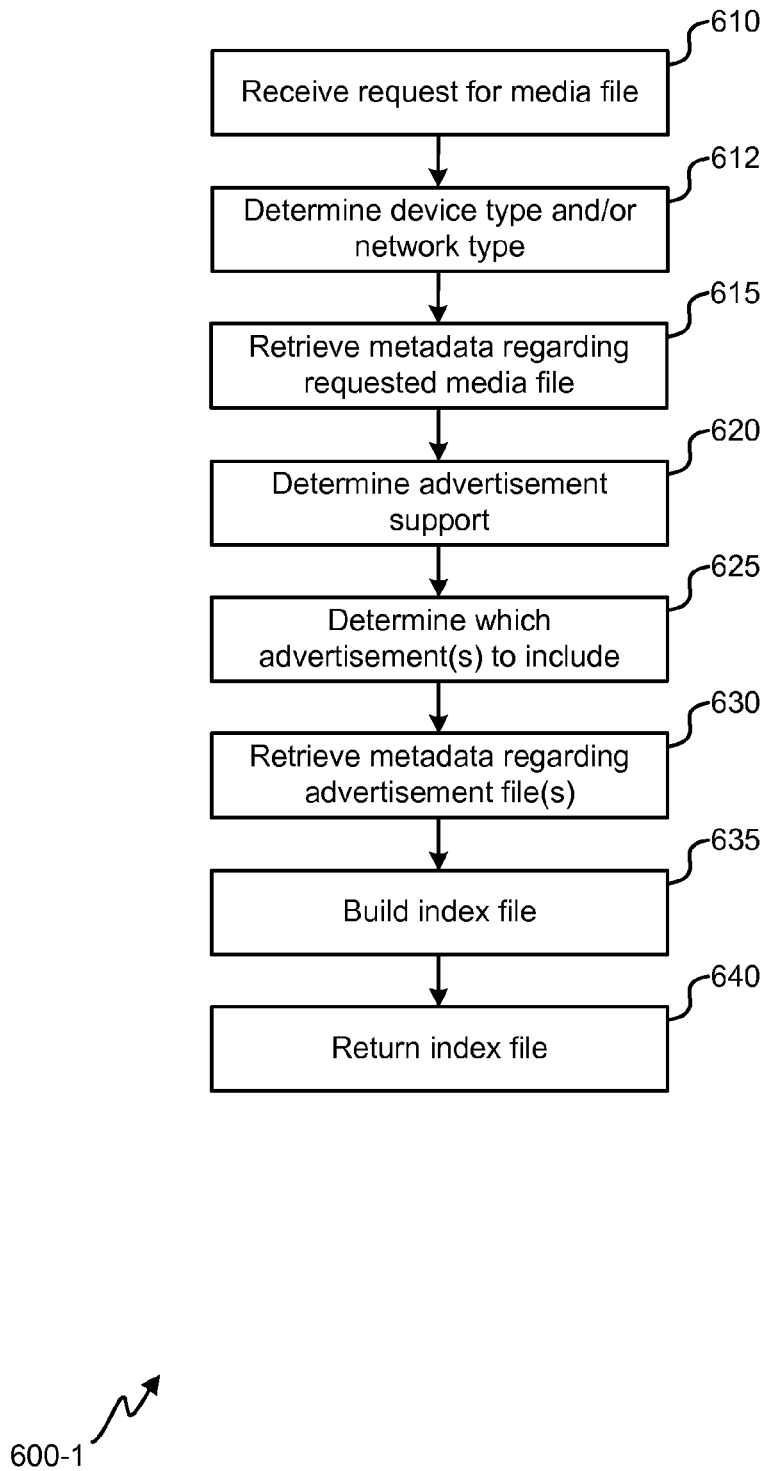
FIG. 6A is a simplified flowchart of a method for providing a media file to any of a variety of clients 510 utilizing a single URL.

FIG. 6A illustrates a simplified flowchart of a method 600-1 for providing a media file to any of a variety of clients 510 utilizing a single URL. This method can be executed, for example, by the index file generator 530 of FIG. 5. The method 600-1 begins at block 610 where a request for a media file is received. Among other things, the request can contain a URL corresponding to the media file.

At block 612, the device type and/or network type is determined. As discussed above, the request can include a header with client ID information. The client ID information can be indicative of a particular device type, including the type of physical device, as well as the type of operating system and/or client the physical device is running Determining the device type can include using one or more databases and/or resorting to a default device type if a particular device type is not identified. As discussed above, the network type can be determined, for example, from the AS number of the client's IP address, which can be associated with a particular network provider (e.g., wireless mobile network provider, wired network provider, etc.).

At block 615, metadata regarding the requested media file is retrieved. The metadata, which can be stored on one or more databases in the CHIMPS 110, for example, can include information regarding the media file such as length, title, author, etc. Additionally, at block 620, advertisement support can be determined. Information regarding advertisement support, which also can be stored on one or more databases, can include whether advertisements can be included in the playback of a media file, and if so, at what points during the playback of the media file.

At block 625, if the media file includes advertisement support, the advertisement(s) to include in the playback of the media file are determined. As discussed previously, determining the advertisement(s) to include can comprise communicating with a content provider 130 (or other entity), who can indicate the advertisement(s) to include. The advertisement(s) (which can be files with a video and/or audio) may be uploaded beforehand to a MFDSP 150, server, or other delivery system, or they may be uploaded by the content provider 130 (or other entity) after the request for the media file is received. The advertisement(s) further may be chunked beforehand, dynamically chunked once requested, comprise complete file(s), or may be already included as part of a permutation of a media file.

At block 630 metadata regarding the advertisement(s) is retrieved. Similar to the metadata for the media file, the metadata for the advertisement(s) can include length, title, etc., which can be used in creating the index file. At block 635, the index file is created using the metadata of the media file and advertisement(s) as well as information regarding the device type, which can impact the format and/or content of the index file. Finally, at block 640, the index file is returned.

The method 600-1 can be executed with every time a media file is requested. Even though a single URL can correspond with a single media file, the content of the index file returned at block 640 may be different. Depending on the type of client (e.g., client ID) and/or type of network and the advertisements to be included in the playback, among other things, the index file can vary to conform to different formats, include different available streaming bit rates, include information regarding different advertisements, and more. Thus, despite the fact that a content provider 130 can provide a single URL to correspond to a particular media file, the streaming experience can be tailored to a particular client 510.

Figure 6B:
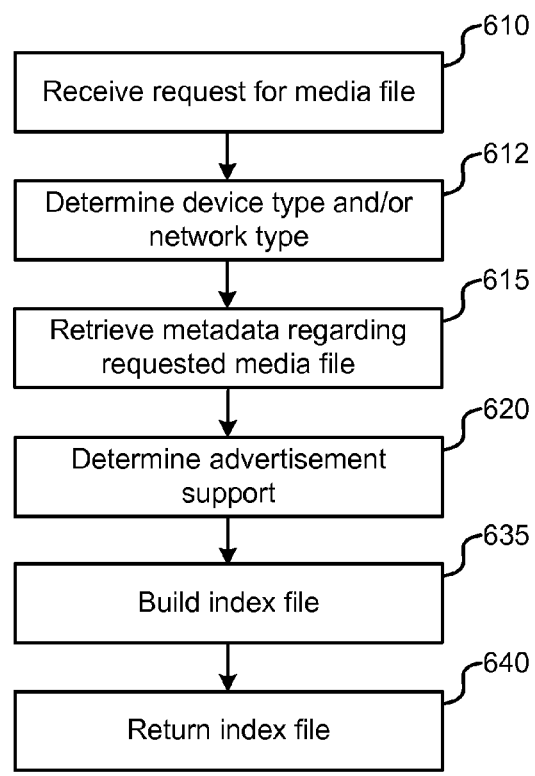
FIG. 6B is a simplified flowchart of another method for providing a media file to any of a variety of clients 510 utilizing a single URL.

FIG. 6B illustrates a simplified flowchart of a method 600-2 for providing a media file to any of a variety of clients 510 utilizing a single URL, similar to the method 600-1 of FIG. 6A. Here, however, the illustrated method 600-2 demonstrates how there can be a reduced number of blocks if it is determined, in block 620, that there is no advertisement support for the requested media file. In this case, the index file can be built at block 635 without any additional determination of advertisement(s) to include in the playback of the media file. That said, there may be one or more advertisements already integrated into the media file.

Figure 6C:
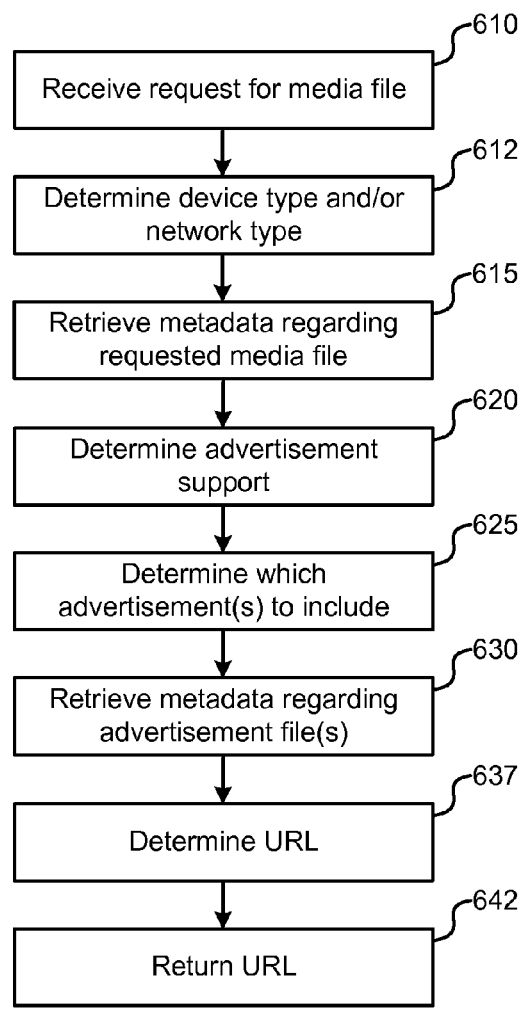
FIG. 6C is a simplified flowchart of yet another method for providing a media file to any of a variety of clients 510 utilizing a single URL.

FIG. 6C illustrates a simplified flowchart of a method 600-3 for enabling a system to provide a media file to any of a variety of clients 510 utilizing a single URL, similar to the methods 600-1, 600-2 of FIGS. 6A-6B. In this method 600-3, however, an index file is not returned. Instead, a URL (or other indicator) is determined, at block 637, and returned, at block 642, to the client 510. This method 600-3 illustrates how the systems and methods described herein can be used in applications where the client does not utilize an index file, but rather requests an entire media file at once. The URL returned to the client at block 642 can indicate the location of a particular permutation of the requested media file with advertisements included as determined at block 625. Depending on the capabilities of the system providing the media file, the particular permutation of the media file can be dynamically generated upon request by the client if not otherwise stored on the system.

Figure 7A:
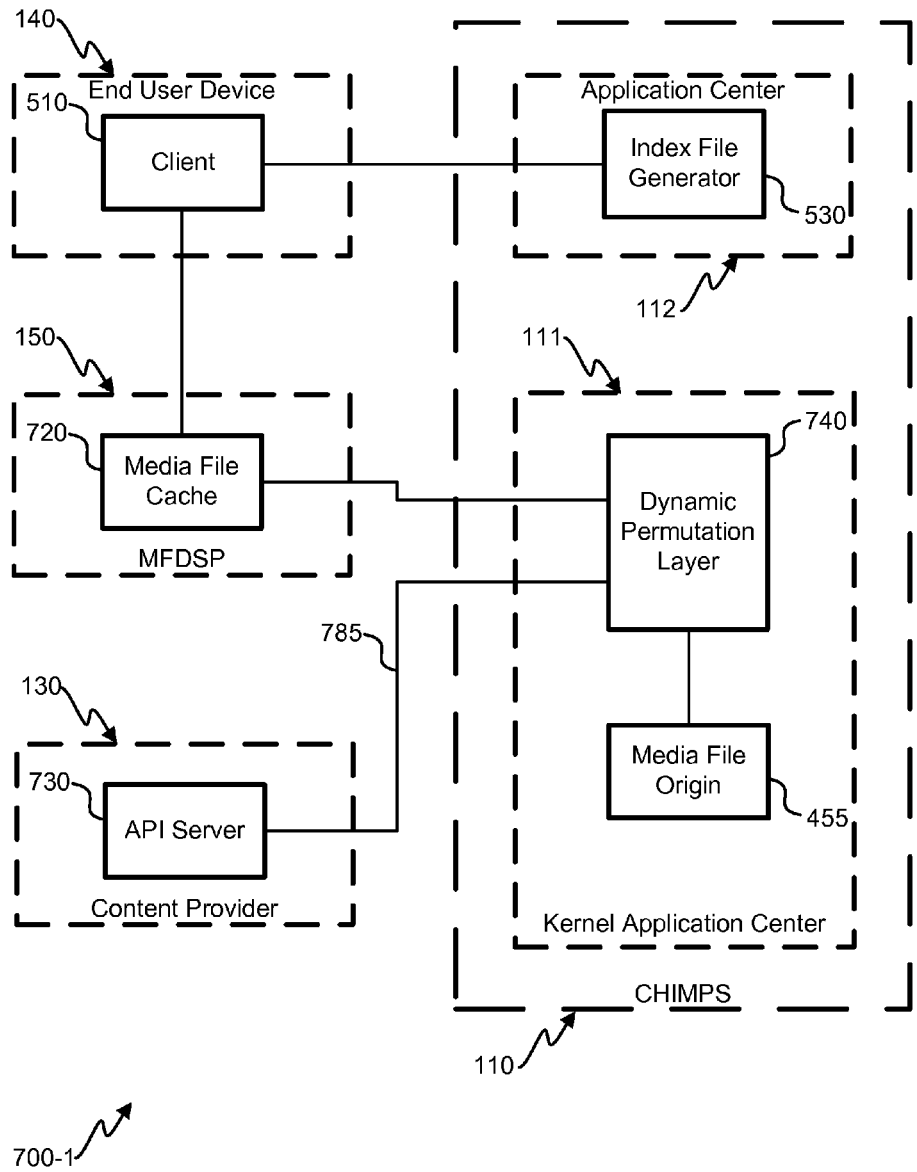
FIG. 7A is an embodiment of a system for delivering content, including media files, which can be chunked and/or encrypted.

Dynamic generation of chunks and/or entire media files may or may not involve transcoding. The media file can be stored in a format where transcoding may not be needed, thereby reducing the processing requirements for creating chunks of media during streaming. For example, media files may be stored such as H.264 or MPEG-4 video format and/or AAC, HE-AAC, or MP3 audio format. According to some streaming protocols, such as some forms of HTTP streaming, chunks of media in these formats would not need transcoding before being wrapped in an MPEG-2 transport stream container format. Instead, such a conversion essentially would require the addition of metadata to create the streaming format from the format of the stored media file. In other words, generating a deliverable chunk of media may only require identifying the stored media file, extracting the relevant segment of the media from the media file, and adding certain metadata in accordance with a container format. This process requires little processing power and can be easily performed on the fly during streaming. More details regarding this process can be found in U.S. patent application Ser. No. 13/092, 299, entitled "TRANSCODELESS ON-THE-FLY AD INSERTION," which is incorporated herein in its entirety. Once the deliverable chunk of media is generated, it can be encrypted according to the techniques described herein.

Where an index file is used, the client can stream the requested media file by using the URLs designated in the index file to download the chunks from a content delivery service. FIG. 7A, shows an embodiment of a system 700-1 for delivering content, including media files, which can be chunked and/or encrypted. The client 510 and index file generator 530 are also illustrated for reference.

In this system 700-1, chunks of media can be generated during media streaming by a dynamic segmentor, which of a dynamic permutation layer (DPL) 740 providing an HTTP service. The DPL 740, as well as the media file origin 455 can be located within a kernel application center 111 of the CHIMPS 110 on, for example, a media file origin server. The system 700-1 can be configured such that the kernel application center 111 provides dynamically-created chunks of media to a MFDSP 150 for delivery to client 510. The MFDSP 150 can store the chunks locally in, for example, a media file cache 720, thereby forgoing the need to dynamically create a chunk again if the same chunk is requested in the future.

After a chunk is dynamically created, if encryption is desired, the DPL 740 also can encrypt the chunk using an encryption key. The encryption key can be, for example, a private key of an asymmetric encryption scheme. Because the overhead of encrypting a chunk of a media file is relatively small, the DPL 740 can encrypt the chunks in real time, as the client 510 is streaming the media file (i.e., as the chunks are being requested). Such a scheme can be implemented in numerous ways.

In one embodiment, the DPL 740 can request a private key through an Application Programming Interface (API) server 730 of the content provider 130. The API server 730 can return the requested encryption key to the DPL 740 via a secure communication link 785, which can be encrypted and/or otherwise secured to help ensure the security of the encryption key is not compromised. The DPL 740 can then use the encryption key to encrypt one or more chunks of a media file, returning the encrypted chunk(s) to the MFDSP 150 for delivery to the client 510. The client can obtain the corresponding decryption key (e.g., public key) from the content provider 130, the CHIMPS 110, or other source.

The functionality provided by this system 700-1 enables the content provider 130 to control encryption of chunks of media. Depending on the desired encryption scheme, the DPL 740 can request a new encryption key—which is provided by the API server 730—for each chunk of a media file. Additionally or alternatively, the DPL 740 can request a new encryption key less frequently, such as with each media file and/or group of media files. Moreover, changing an encryption key may be time based, such that the DPL 740 requests a new encryption key every minute, hour, day, etc. In addition, or as an alternative, the API server 730 may provide a new encryption key to the DPL 740 without a request from the DPL 740.

In another embodiment, the DPL 740 can generate an encryption key. In this embodiment, the DPL 740 can utilize an algorithm provided by the API server 730 via the secure communication link 785. The API server 730 and DPL 740 can run the algorithm in synchronization to generate identical encryption/decryption keys, such that the encryption key does not need to be communicated between the API server 730 and the DPL 740. Moreover, the API server 730 can provide an algorithm in each response to the DPL's requests, thereby allowing the DPL 740 to generate the encryption key without the need to store an algorithm or otherwise have access to the algorithm beforehand. Alternatively, the DPL 740 can store a variety of algorithms for encryption key generation, and the API server 730 could indicate an algorithm to use in response to an algorithm request from the DPL 740. Such functionality can give the allow content provider 130 control of encryption keys and/or encryption key generation.

Alternatively, the DPL 740 can simply generate the encryption key (which can be generated for each chunk, media file, etc., or may be time based, as discussed above). In this case, the DPL 740 can provide the encryption key to the API server 730, or retain the encryption key without sharing it, depending on the desired functionality.

In sum, the system 700-1 for indexing and encrypting dynamically-created chunks of a media file can, after receiving a request for an index file from a client 510, dynamically generate an index file with an index file generator 530. The index file can, among other things, indicate where a next chunk of a media file may be located. A client can then request the chunk from the location indicated by the index file, which can comprise a media file cache 720 in a MFDSP 150. If the chunk is not found in the media file cache 720, or if the chunk is encrypted with an outdated encryption key, the cache miss can redirect the request to a DPL 740, which can dynamically generate the requested chunk by accessing the corresponding media file in the media file origin 455. The DPL 740 determines an encryption key (e.g., by generating the encryption key, receiving it from the API server, etc.) and creates an encrypted chunk by encrypting the requested chunk with the encryption key. The encrypted chunk then can be provided to the MFDSP 150 for storage in the media file cache 720 and delivery to the client 510. If the same chunk is requested at a later point in time (and the chunk is not encrypted with an outdated encryption key) the MFDSP 150 can deliver the chunk from the media file cache 720, thereby forgoing the need to redirect the request to the DPL 740 to regenerate the chunk.

The determination of whether an encrypted chunk in the media file cache 720 of the MFDSP 150 has an outdated encryption key can be made in a variety of ways. For example, the DPL 740, upon receiving and/or generating the encryption key, can notify the MFDSP 150 of the update so that the MFDSP 150 can delete and/or overwrite any affected files. Alternatively, the DPL 740 can inform the index file generator 530 of an update in the encryption key. The index file generator 530 can adjust index files accordingly, indicating, for example, an encryption key version number in a URL of the index file. If the MFDSP 150 cannot match the URL to any cashed location in the media file cache 720, it will request an updated chunk from the DPL 740. Other techniques for indicating expired encryption keys, and other methods of encryption (e.g., RSA, symmetric key, etc.) also are contemplated.

Figure 7B:
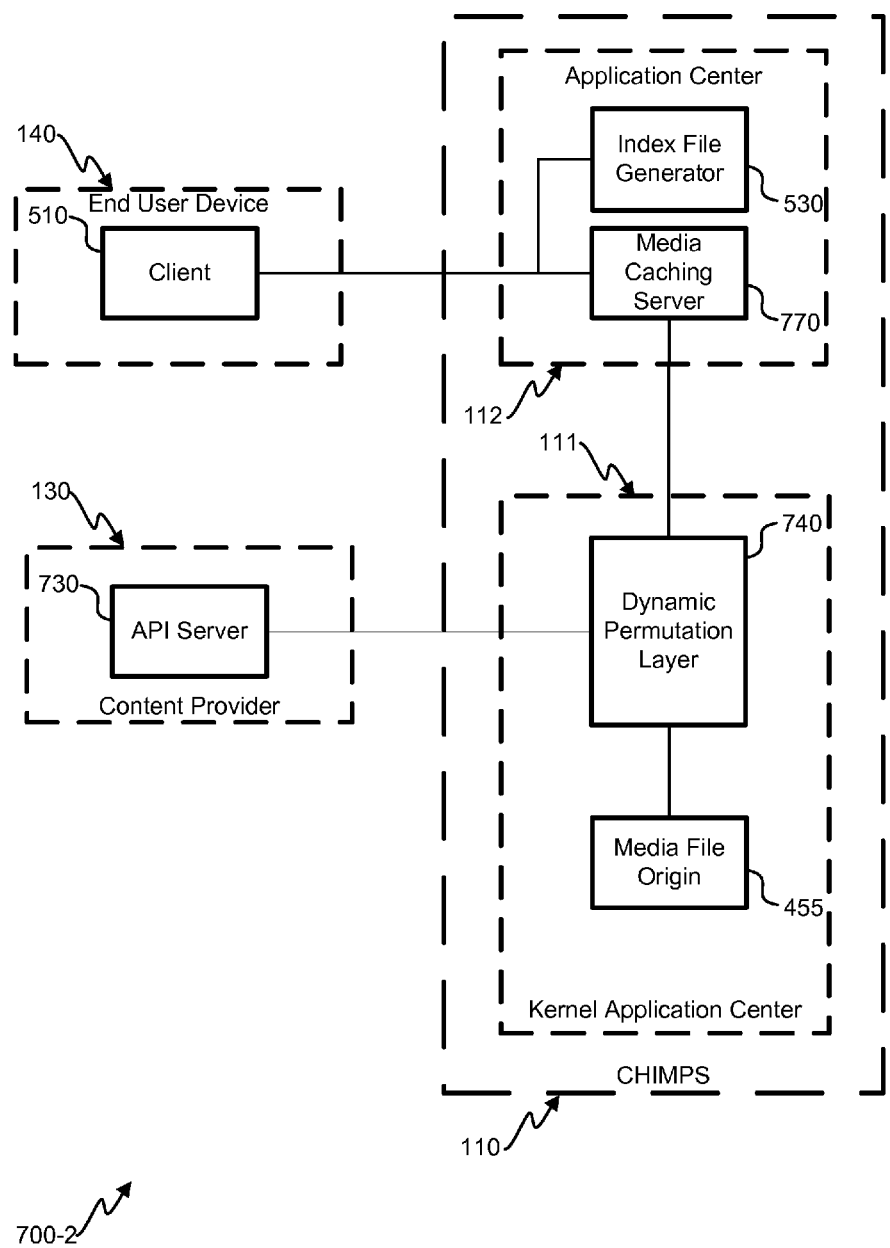
FIG. 7B is another embodiment of a system for delivering content, including media files, which can be chunked and/or encrypted.

FIG. 7B illustrates an alternative embodiment 700-2 of a system for indexing and encrypting dynamically-created chunks of a media for media streaming. Rather than utilize a MFDSP, this embodiment 700-2 includes a media caching server 770 within an application center 112 of the CHIMPS 110. The media caching server 770 can receive chunk requests from, and provide the corresponding chunks to, a client 510. It will be understood that such a media caching server(s) 770 or similar device(s) can be located anywhere within the CHIMPS 110 and/or in a system(s) communicatively linked to the CHIMPS 110.

Figure 8:
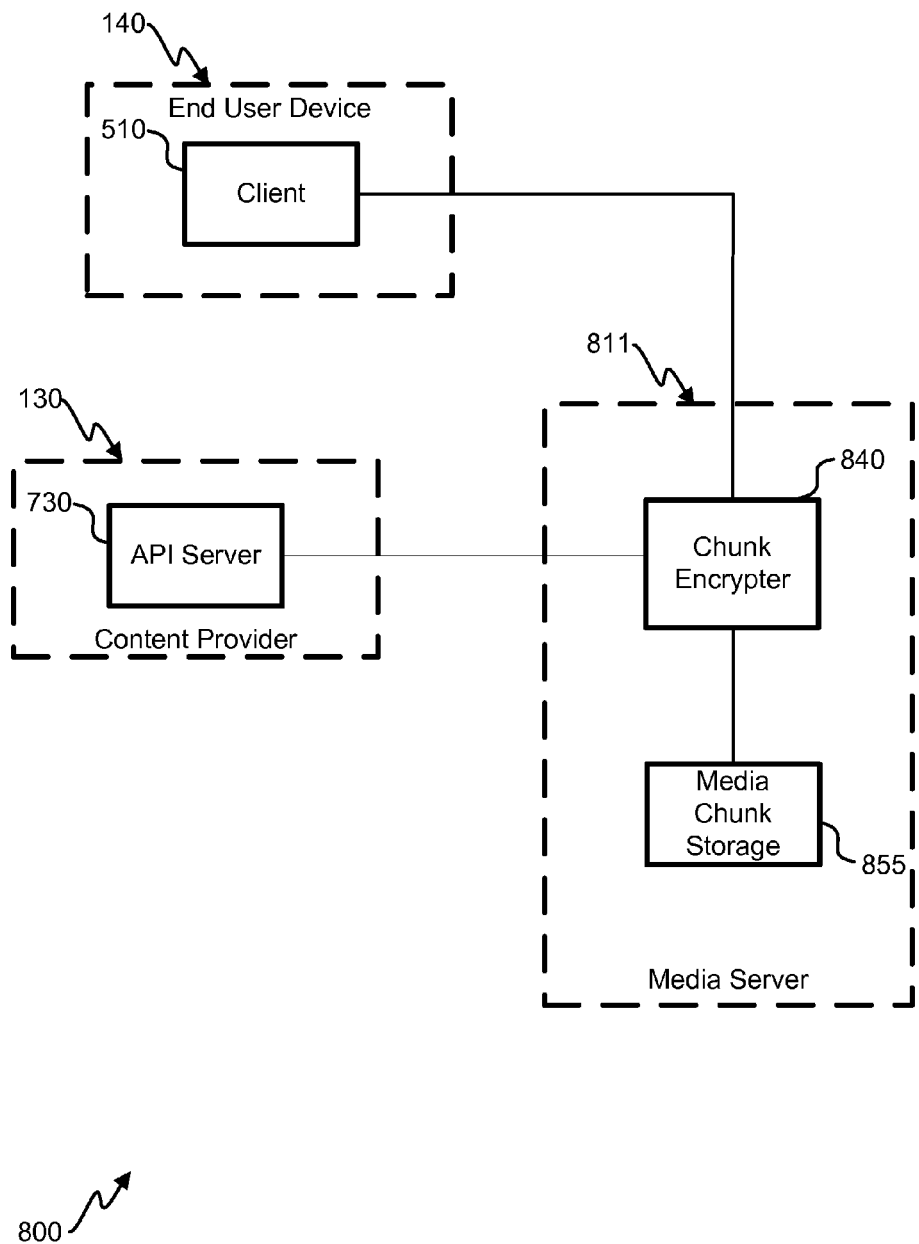
FIG. 8 s a simplified illustration of an embodiment of a system for dynamic encryption integrated into a traditional system that may not have dynamic chunking and/or dynamic indexing capabilities.

FIG. 8 is a simplified illustration of an embodiment 800 of a system for dynamic encryption integrated into a traditional system that may not have dynamic chunking and/or dynamic indexing capabilities. Here, an index file for streaming a media file can include a URL that directs a client 510 to a media server 811. The media server 811 can include a chunk encrypter 840 communicatively connected with an API server 730 of a content provider 130, as well as a media chunk storage 855 that stores media chunks for media file(s). After receiving a request for a media chunk from the client 510, the chunk encrypter 840 can retrieve the requested chunk from media chunk storage 855 and determine an encryption key using techniques such as those disclosed above (e.g., receive an encryption key from the API server 730, generate the encryption key, etc.). The chunk encrypter 840 then can create an encrypted media chunk by encrypting the requested media chunk with the encryption key, and provide the encrypted media chunk to the client.

The embodiment 800 shown in FIG. 8 is provided as an example and is not limiting. As with other illustrations provided herein, the embodiment 800 can be altered in numerous ways without departing from the spirit and scope of this disclosure. For example, the media chunks may be stored at a location and/or system remote from the media server 811. Moreover, encrypted chunks may be cached by one or more caching server(s) that may be communicatively linked between the client 510 and the chunk encrypter 840. Other such variations are contemplated.

Figure 9A:
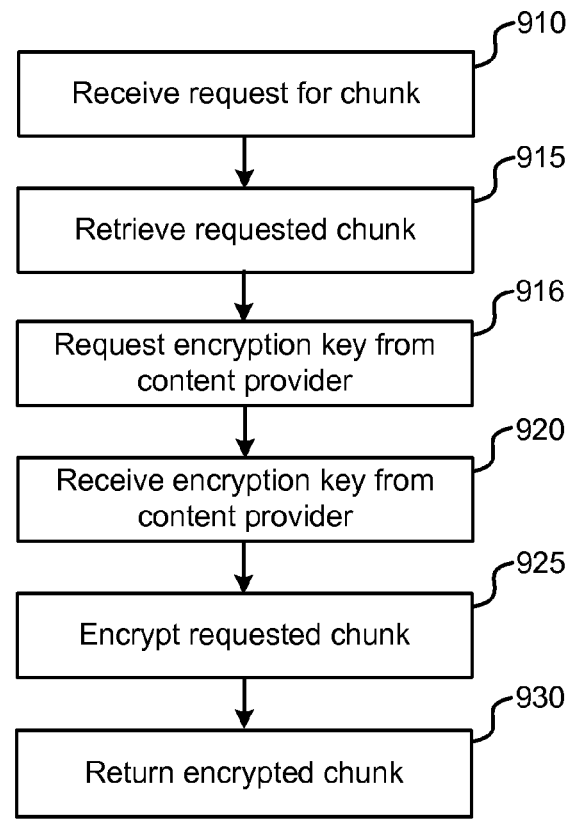
FIG. 9A is a simplified flowchart of a method for dynamically encrypting chunks of media for media streaming.

FIG. 9A illustrates a simplified flowchart of a method 900-1 for dynamically encrypting chunks of media for media streaming, which can be executed, for example, by the DPL 740 or chunk encrypter 840. The method 900-1 begins at block 910 where a request for a chunk of a media file is received. As indicated earlier, such a request can come from a MFDSP 150, media caching server 770, or other media servicing system. Alternatively, the request can come directly from a client 510 running on an end user device 140. At block 915, the requested chunk is retrieved.

At block 916, an encryption key is requested from a content provider 130, and at block 920 the encryption key is received from the content provider 130. Because this exchange involves an encryption key, it can be done over a secure communication link, as discussed above. Moreover, the request for the encryption key from the content provider may be sent prior to, or in conjunction with, the retrieval of the requested chunk. Such timing may increase efficiency by reducing the overall time it takes to execute the method 900-1 of FIG. 9A. Although the term "content provider" is used in the method 900-1 and in other figures provided herein, other entities can be used as an encryption key source. After the encryption key is received, the requested chunk is encrypted at block 925 and returned at block 930.

Figure 9B:
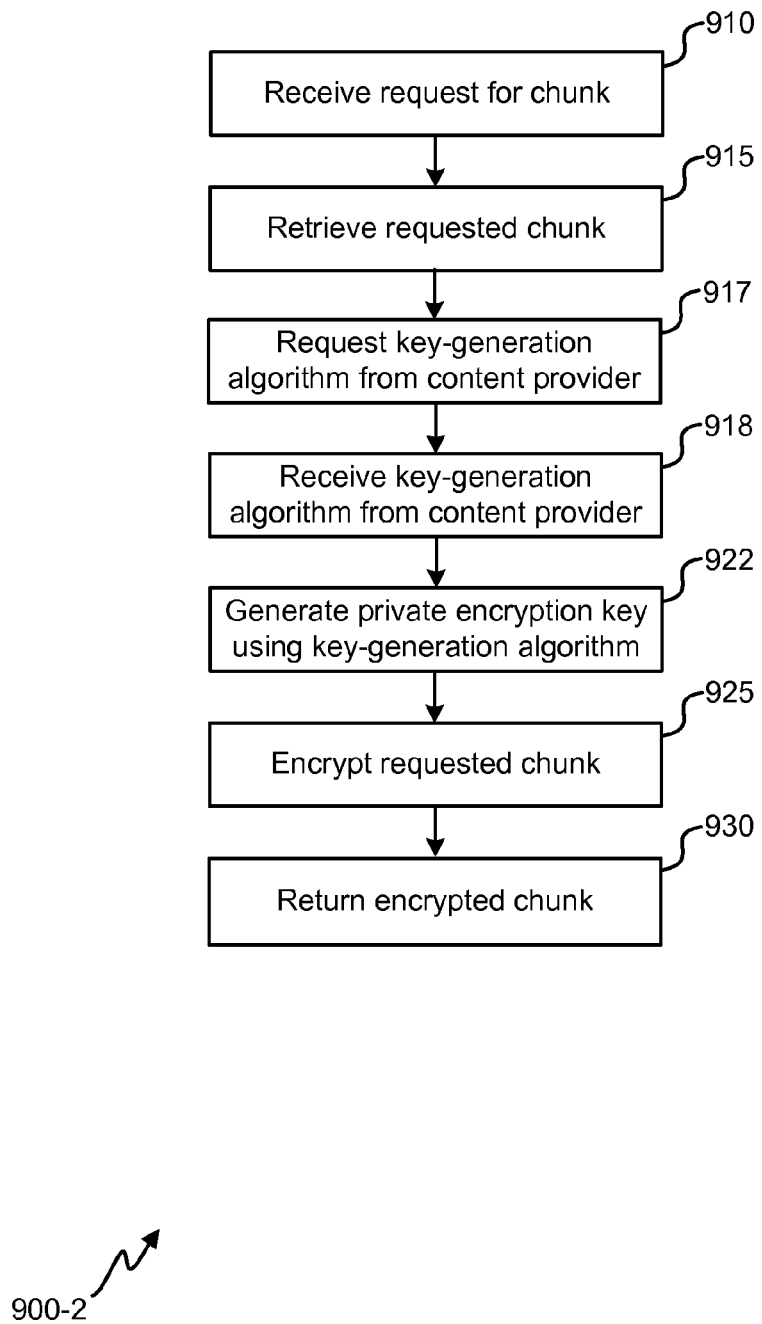
FIG. 9B is a simplified flowchart of another method for dynamically encrypting chunks of media for media streaming.

FIG. 9B illustrates a simplified flowchart of a method 900-2 for dynamically encrypting chunks of media for media streaming, similar to the method 900-1 illustrated in FIG. 9A. Here, however, in response to receiving a request for a chunk at block 910, the method 900-2 includes requesting a key-generation algorithm from a content provider 130 at block 917 and receiving the key-generation algorithm from the content provider at block 918. Additionally, at block 922, an encryption key is generated using the received key-generation algorithm. As indicated earlier, such functionality enables the system executing the method 900-2 to provide encryption without the need to store encryption keys and/or algorithms. It also enables the content provider 130 to control generation of the encryption keys, allowing the content provider 130 to rotate encryption keys at virtually any time.

Figure 9C:
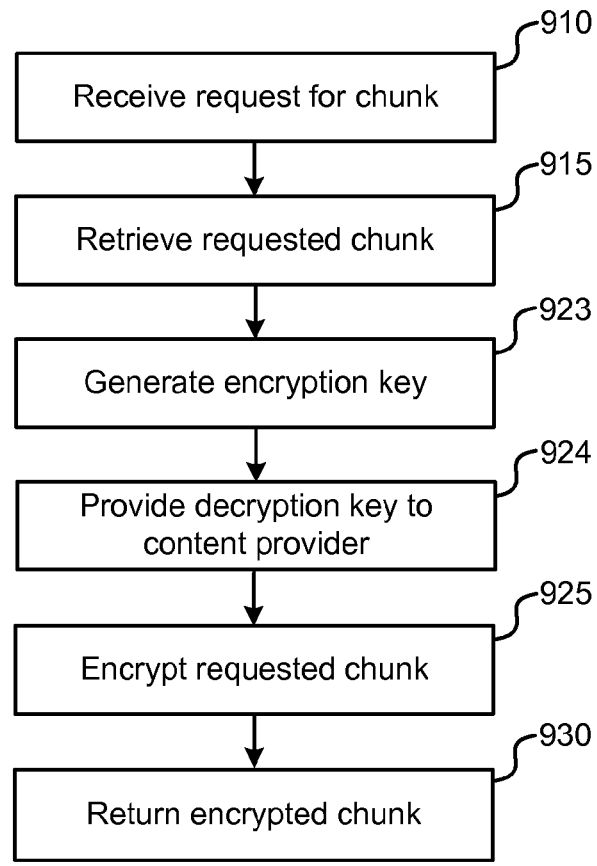
FIG. 9C is a simplified flowchart of yet another method for dynamically encrypting chunks of media for media streaming.

FIG. 9C illustrates a simplified flowchart of a method 900-3 for dynamically encrypting chunks of media for media streaming involving encryption key generation, similar to the method 900-2 illustrated in FIG. 9B. Rather than request a key-generation algorithm, however, the method includes generating the encryption key at block 923 and providing the corresponding decryption key to the content provider 130 at block 924. Thus, unlike the methods 900-1, 900-2 of FIGS. 9A and 9B, the content provider 130 has a more passive role in the encryption of the chunks, with little or no involvement in the generation of the encryption key. That said, the generation of the encryption key may be in accordance with techniques and/or algorithms provided by a content provider 130.

FIGS. 9A-9C are provided as examples and are not limiting. The methods 700 can be modified for different functionality. For example, the methods may be modified to encrypt multiple chunks with the same encryption key, such as all chunks of a certain media file, all chunks requested within a certain time window, etc.

FIG. 10 is an illustration of a simplified swim lane diagram showing the interaction of components in a system configured to provide dynamic encryption, according to one embodiment. In this embodiment, a client can send a request for a chunk at block 1005. Depending on the streaming protocol, the request may be made while a client plays a chunk of media previously downloaded during streaming. The request received by a MFDSP 150 at 1010. As discussed above, the use of a MFDSP 150 is optional; other embodiments may include components other than a MFDSP 150.

Blocks 1015 and 1017 help determine whether the MFDSP 150 can return the encrypted chunk corresponding to the requested chunk without a call to the DPL 740. At block 1015, the MFDSP 150 determines whether the requested chunk is in cache. If not, the process moves to block 1020, where the MFDSP 150 requests the chunk from the DPL 740.

Otherwise, if the chunk is cached at the MFDSP 150, the process moves to block 1017 where the MFDSP 150 determines whether the encryption of the chunk is current. As discussed above, such a determination can be made in several ways. For example, an encryption version can be embedded in the URL, the MFDSP 150 can be notified by the DPL 740 of a change in the encryption key, etc. If the encryption is current, the MFDSP 150 can simply return the encrypted chunk, at block 1080. Otherwise, the MFDSP 150 requests the chunk from the DPL 740 at block 1020.

At block 1025, the DPL 740 receives the request for the chunk, and at block 1030 retrieves the chunk. As discussed previously, certain embodiments can allow for the chunk to be created dynamically by the DPL 740. Otherwise, the DPL 740 (or other system configured to encrypt chunks) can retrieve the chunk from storage. Before the chunk is encrypted, the encryption key must be obtained. Thus, at block 1035, the DPL 740 requests the encryption key.

At block 1040, the API server (which can be hosted by the content provider of the media file corresponding to the chunk, or other entity) receives the DPL's request for an encryption key. The API server then generates or otherwise obtains the encryption key, at block 1045. The encryption key can be, for example, stored in memory and used for multiple requests, rotated on a time and/or file basis, etc. Alternatively, a new key can be generated for each request received by the DPL 740. In any case, the encryption key is returned to the DPL 740 at block 1050.

The DPL 740 receives the encryption key from the API server at block 1055. With the encryption key, the DPL 540 encrypts the chunk, at block 1060. The encrypted chunk is then returned to the MFDSP 150 at block 1065.

At block 1070, the MFDSP 150 receives the encrypted chunk from the DPL 740. The MFDSP 150 then can cache the encrypted chunk at block 1075, thereby enabling the MFDSP 150 to provide it to clients who request the chunk in the future (provided, of course, that the encryption is current at the time of the future client requests). At block 1080, the MFDSP 150 returns the encrypted chunk to the client, which is received at block 1085. The client 510 can decrypt the encrypted chunk by utilizing a corresponding decryption key, which, in asymmetric encryption, can be provided by the API server 730 (or another system of the content provider) in a variety of ways.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a non-volatile computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for providing a plurality of encrypted segments of a media file over a data network, the method comprising:

receiving, at a server, a request for a first segment of the media file;

retrieving the first segment of the media file, wherein the first segment of the media file comprises one of a plurality of segments of the media file that are each separately-addressable from an application layer using a corresponding URI, the first segment of the media file having media content for playback over a period of time;

determine a first encryption key;

creating an encrypted first segment of the media file by encrypting the first segment of the media file using the first encryption key, wherein the encrypting the first segment of the media file occurs after receiving the request for the first segment of the media file;

providing, with the server, the encrypted first segment of the media file;

receiving, at the server, a request for a second segment of the media file;

retrieving the second segment of the media file, wherein the second segment of the media file comprises one of the plurality of segments of the media file that are each separately-addressable from the application layer using the corresponding URI, the second segment of the media file having media content for playback over a period of time;

determining a second encryption key;

creating an encrypted second segment of the media file by encrypting the second segment of the media file using the second encryption key, wherein the encrypting the second segment of the media file occurs after receiving the request for the second segment of the media file; and providing, with the server, the encrypted second segment of the media.

2. The method for providing the plurality of encrypted segments of the media file over the data network as recited in claim 1, wherein the second encryption key is different than the first encryption key.

3. The method for providing the plurality of encrypted segments of the media file over the data network as recited in claim 1, wherein the requests for the first and second segments of the media file are received from a Media File Delivery Service Provider (MFDSP).

4. The method for providing the plurality of encrypted segments of the media file over the data network as recited in claim 3, wherein the encrypted first and second segments of the media file are provided to the MFDSP.

5. The method for providing the plurality of encrypted segments of the media file over the data network as recited in claim 1, wherein the receiving the requests for the first and second segments of the media file and the providing the encrypted first and second segments of the media file occur during playback of the media file by a device communicatively linked to the data network.

6. The method for providing the plurality of encrypted segments of the media file over the data network as recited in claim 1, wherein the determining the first encryption key comprises generating the first encryption key.

7. The method for providing the plurality of encrypted segments of the media file over the data network as recited in claim 6, wherein the generating the first encryption key comprises using an algorithm received over a communication link.

8. The method for providing the plurality of encrypted segments of the media file over the data network as recited in claim 6, further comprising providing a first decryption key for decrypting the encrypted first segment of the media file.

9. The method for providing the plurality of encrypted segments of the media file over the data network as recited in claim 1, wherein determining the first encryption key comprises:
  requesting, over a communication link, the first encryption key; and
  receiving, over the communication link, the first encryption key.

10. The method for providing the plurality of encrypted segments of the media file over the data network as recited in claim 9, wherein determining the second encryption key comprises:
  requesting, over the communication link, the second encryption key; and
  receiving, over the communication link, the second encryption key.

11. The method for providing the plurality of encrypted segments of the media file over the data network as recited in claim 1, determining the first encryption key comprises retrieving the first encryption key from data storage.

12. A non-volatile computer-readable storage medium having instructions embedded thereon, which, when executed by a processor, cause the processor to perform the method for providing the plurality of encrypted segments of the media file over the data network as recited in claim 1.

13. A server for communicating, via a network, a media file having a plurality of segments, the server comprising:
  a network interface;
  a memory configured to store one or more of the plurality of segments; and
  a processor communicatively coupled with the memory and the network interface and configured to cause the server to:
    receive, using the network interface, a request for a first segment of the media file;
    retrieve the first segment of the media file from the memory, wherein the first segment of the media file comprises one of a plurality of segments of the media file that are each separately-addressable from an application layer using a corresponding URI, the first segment of the media file having media content for playback over a period of time;
    determine a first encryption key;
    create an encrypted first segment of the media file by encrypting the first segment of the media file using the first encryption key, wherein encrypting the first segment of the media file occurs after receiving the request for the first segment of the media file;
    provide, using the network interface, the encrypted first segment of the media file;
    receive, using the network interface, a request for a second segment of the media file;
    retrieve the second segment of the media file from the memory, wherein the second segment of the media file comprises one of the plurality of segments of the media file that are each separately-addressable from the application layer using the corresponding URI, the second segment of the media file having media content for playback over a period of time;
    determine a second encryption key;
    create an encrypted second segment of the media file by encrypting the second segment of the media file using the second encryption key, wherein the encrypting the second segment of the media file occurs after receiving the request for the second segment of the media file; and
    provide, using the network interface, the encrypted second segment of the media file.

14. The server for communicating, via the network, the media file having the plurality of segments as recited in claim 13, wherein the processor is configured to cause the server to receive the requests for the first and second segments of the media file from a Media File Delivery Service Provider (MFDSP).

15. The server for communicating, via the network, the media file having the plurality of segments as recited in claim 13, wherein the processor is configured to cause the server to provide the encrypted first and second segments of the media file are to the MFDSP.

16. The server for communicating, via the network, the media file having the plurality of segments as recited in claim 13, the processor is configured to cause the server to receive the requests for the first and second segments of the media file and provide the encrypted first and second segments of the media file during playback of the media file by a device communicatively linked to the network.

17. The server for communicating, via the network, the media file having the plurality of segments as recited in claim 13, wherein determining the first encryption key comprises generating the first encryption key.

18. The server for communicating, via the network, the media file having the plurality of segments as recited in claim 17, the processor is configured to cause the server to:
  receive an algorithm via the network interface; and
  use the algorithm to generate the first encryption key.

19. The server for communicating, via the network, the media file having the plurality of segments as recited in claim 13, wherein the processor is configured to cause the server to determine the first encryption key by:
  requesting, using the network interface, the first encryption key; and
  receiving, using the network interface, the first encryption key.

20. The server for communicating, via the network, the media file having the plurality of segments as recited in claim 19, wherein the processor is configured to cause the server to determine the second encryption key by:
   requesting, using the network interface, the second encryption key; and
   receiving, using the network interface, the second encryption key.

21. The server for communicating, via the network, the media file having the plurality of segments as recited in claim 13, wherein the processor is configured to cause the server to determine the first encryption key by retrieving the first encryption key from the memory.

22. A system for securely communicating, with a network, a media file, the system comprising:
   a data storage configured to store the media file; and
   a processing server communicatively coupled with the data storage, the processing server configured to:
      receive a request for a first segment of the media file, the first segment of the media file comprising one of a plurality of segments of the media file that are each separately-addressable from an application layer using a corresponding URI;
      retrieve at least a portion of the media file from the data storage;
      generate the first segment of the media file, wherein the first segment of the media file comprises media content for playback over a period of time;
      determine a first encryption key;
      create an encrypted first segment of the media file by encrypting the first segment of the media file using the first encryption key, wherein the encrypting the first segment of the media file occurs after the request for the first segment of the media file is received;
      provide the encrypted first segment of the media file;
      receive a request for a second segment of the media file, the second segment of the media file comprising one of the plurality of segments of the media file that are each separately-addressable from the application layer using the corresponding URI;
      generate the second segment of the media file, wherein the second segment of the media file comprises media content for playback over a period of time;
      determine a second encryption key;
      create an encrypted second segment of the media file by encrypting the second segment of the media file using the second encryption key, wherein the encrypting the second segment of the media file occurs after receiving the request for the second segment of the media file; and
      provide the encrypted second segment of the media file.

23. The system for securely communicating, with the network, the media file as recited in claim 22, further comprising a media caching server configured to:
   send the requests for the first and second segments of the media file, via the network, to the processing server;
   receive the encrypted first and second segments of the media file, via the network, from the processing server; and
   store the encrypted first and second segments of the media file in a memory.

24. The system for securely communicating, with the network, the media file as recited in claim 23, wherein the media caching server is further configured to provide the encrypted first and second segments of the media file to a device communicatively coupled with the media caching server.

25. The system for securely communicating, with the network, the media file as recited in claim 24 configured such that the media caching server will not send the requests for a segment of the media file via the network to the processing server if the media caching server has the segment of the media file stored in the memory.

* * * * *